(12) United States Patent
Arazi et al.

(10) Patent No.: US 7,107,057 B2
(45) Date of Patent: Sep. 12, 2006

(54) WIRELESS PRIVATE BRANCH EXCHANGE (WPBX) AND COMMUNICATING BETWEEN MOBILE UNITS AND BASE STATIONS

(75) Inventors: Nitzan Arazi, Ramat Hasharon (IL); Yaron Soffer, Nes-Ziona (IL); Haim Barak, Kfar Saba (IL)

(73) Assignee: Commil Ltd., Petah Tikva (IL)

( * ) Notice: Subject to any disclaimer, the term of this patent is extended or adjusted under 35 U.S.C. 154(b) by 109 days.

(21) Appl. No.: 10/077,969

(22) Filed: Feb. 20, 2002

(65) Prior Publication Data

US 2002/0147016 A1 Oct. 10, 2002

Related U.S. Application Data

(62) Division of application No. 09/784,109, filed on Feb. 16, 2001, now Pat. No. 6,430,395.
(60) Provisional application No. 60/208,306, filed on Jun. 1, 2000, and provisional application No. 60/195,219, filed on Apr. 7, 2000.

(51) Int. Cl.
*H04Q 7/20* (2006.01)

(52) U.S. Cl. ............ 455/443; 455/436; 455/438; 455/450
(58) Field of Classification Search ............ 455/443, 455/436, 446, 449, 450, 555, 502, 438, 439; 370/328, 331, 343, 344; 375/132, 133
See application file for complete search history.

(56) References Cited

U.S. PATENT DOCUMENTS 4,617,674 A 10/1986 Mangulis et al.

| 5,115,463 A | 5/1992 | Moldavsky et al. |
| 5,255,307 A | 10/1993 | Mizikovsky |
| 5,353,331 A | 10/1994 | Emery et al. |

(Continued)

FOREIGN PATENT DOCUMENTS

| EP | 0 594 354 | 4/1994 |
| GB | 2337669 | 11/1999 |

OTHER PUBLICATIONS

Copy of International Search Report for PCT/US01/08793, mailed on Jun. 8, 2001.

*Primary Examiner*—Erika A. Gary
(74) *Attorney, Agent, or Firm*—Pearl Cohen Zedek Latzer LLP

(57) ABSTRACT

Methods to create a cellular-like communication system, such as a Wireless Private Branch Exchange (WPBX), which includes mobile devices such as standard cordless phones (handsets), particularly, mobile devices utilizing the Bluetooth short-range wireless communication protocol. The methods provide seamless and reliable handoff of sessions between Base Stations while the mobile device is moving between picocells, by implementing a high-level of synchronization between the Base Stations and the Switch. Base Stations of picocells having small coverage areas communicate with the handsets. The communication protocol is divided into a low-level protocol performed by the Base Stations and a high-level protocol performed by the Switch connected to all the Base Stations. The methods support mobile computing or telephony devices and communication protocols, which are not specified to handle handoffs of sessions while moving between Base Stations coverage areas in a data, voice or telephony wireless network.

11 Claims, 24 Drawing Sheets

U.S. PATENT DOCUMENTS

| | | | |
|---|---|---|---|
| 5,410,588 A | 4/1995 | Ito | |
| 5,448,569 A | 9/1995 | Huang et al. | |
| 5,469,496 A | 11/1995 | Emery et al. | |
| 5,506,887 A | 4/1996 | Emery et al. | |
| 5,519,706 A | 5/1996 | Bantz et al. | |
| 5,519,759 A | 5/1996 | Heineck et al. | |
| 5,537,434 A | 7/1996 | Persson et al. | |
| 5,546,411 A | 8/1996 | Leitch et al. | |
| 5,579,379 A | 11/1996 | D'Amico et al. | |
| 5,610,972 A | 3/1997 | Emery et al. | |
| 5,664,005 A | 9/1997 | Emery et al. | |
| 5,715,521 A | 2/1998 | Fukasawa et al. | |
| 5,734,699 A | 3/1998 | Lu et al. | |
| 5,745,850 A | 4/1998 | Aldermeshian et al. | |
| 5,758,281 A | 5/1998 | Emery et al. | |
| 5,809,415 A | 9/1998 | Rossmann | |
| 5,818,824 A | 10/1998 | Lu et al. | |
| 5,822,313 A | 10/1998 | Malek et al. | |
| 5,845,211 A | 12/1998 | Roach | |
| 5,887,256 A | 3/1999 | Lu et al. | |
| 5,896,375 A | 4/1999 | Dent et al. | |
| 5,911,120 A | 6/1999 | Jarett et al. | |
| 5,913,163 A | 6/1999 | Johansson | |
| 5,960,344 A | 9/1999 | Mahany | |
| 5,999,813 A | 12/1999 | Lu et al. | |
| 6,005,856 A | 12/1999 | Jensen et al. | |
| 6,009,332 A * | 12/1999 | Haartsen | 455/450 |
| 6,011,975 A | 1/2000 | Emery et al. | |
| 6,021,138 A | 2/2000 | Lee | |
| 6,047,177 A | 4/2000 | Wickman | |
| 6,055,427 A | 4/2000 | Ojaniemi | |
| 6,058,106 A | 5/2000 | Cudak et al. | |
| 6,069,588 A | 5/2000 | O'Neill | |
| 6,078,571 A | 6/2000 | Hall | |
| 6,119,006 A | 9/2000 | Shaffer et al. | |
| 6,151,311 A | 11/2000 | Wheatley, III et al. | |
| 6,163,546 A | 12/2000 | Sipila | |
| 6,175,850 B1 | 1/2001 | Ishii et al. | |
| 6,201,962 B1 | 3/2001 | Sturniolo et al. | |
| 6,205,552 B1 | 3/2001 | Fudge | |
| 6,212,395 B1 | 4/2001 | Lu et al. | |
| 6,226,515 B1 | 5/2001 | Pauli et al. | |
| 6,259,685 B1 | 7/2001 | Rinne et al. | |
| 6,275,518 B1 | 8/2001 | Takahashi et al. | |
| 6,278,699 B1 | 8/2001 | Atarius | |
| 6,295,310 B1 | 9/2001 | Yamauchi et al. | |
| 6,321,089 B1 * | 11/2001 | Han | 455/438 |
| 6,396,457 B1 | 5/2002 | Gatherer et al. | |
| 6,430,395 B1 | 8/2002 | Arazi et al. | |
| 6,466,791 B1 | 10/2002 | Kabasawa | |
| 6,490,446 B1 * | 12/2002 | Haartsen | 455/422.1 |
| 6,510,381 B1 | 1/2003 | Grounds et al. | |
| 6,529,732 B1 | 3/2003 | Vainiomäki et al. | |
| 6,628,632 B1 | 9/2003 | Dolan | |
| 6,640,098 B1 | 10/2003 | Roundtree | |
| 6,650,871 B1 | 11/2003 | Cannon et al. | |
| 6,816,729 B1 | 11/2004 | Halonen | |
| 2002/0122396 A1 | 9/2002 | Terasawa | |
| 2002/0132630 A1 | 9/2002 | Aratzi et al. | |
| 2002/0147016 A1 | 10/2002 | Azazi et al. | |
| 2002/0160779 A1 | 10/2002 | Azazi et al. | |
| 2002/0160806 A1 | 10/2002 | Aratzi et al. | |
| 2002/0164991 A1 | 11/2002 | Aratzi et al. | |
| 2004/0085938 A1 | 5/2004 | Tiedemann, Jr. et al. | |

\* cited by examiner

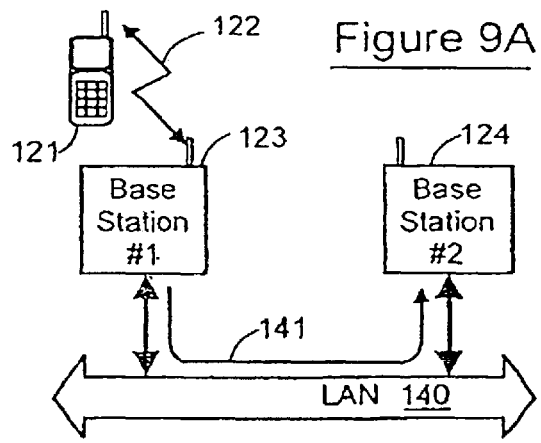
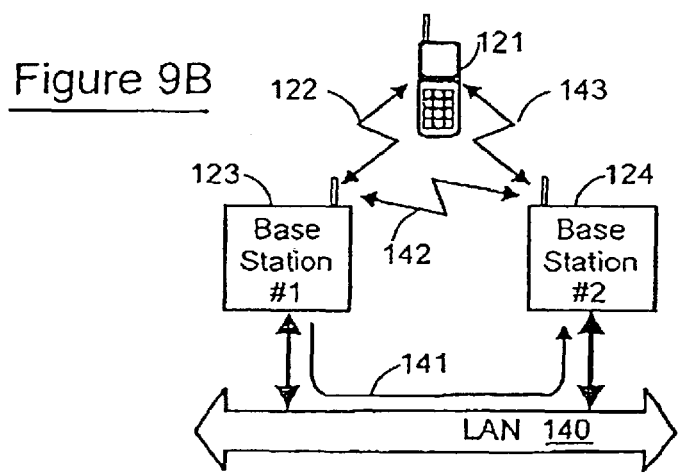
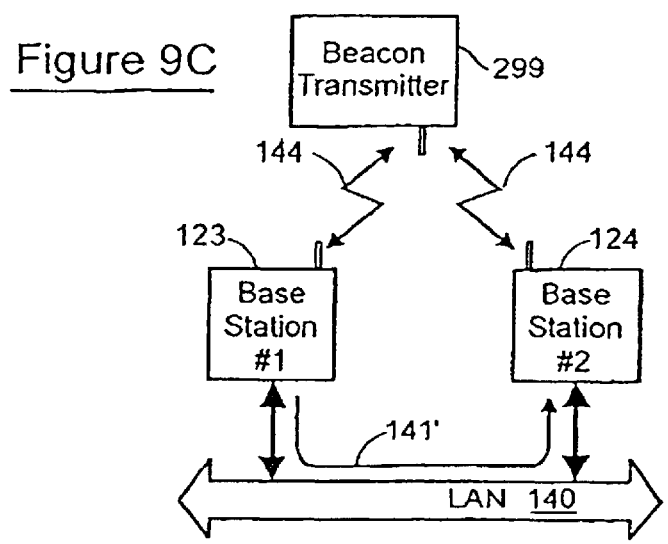

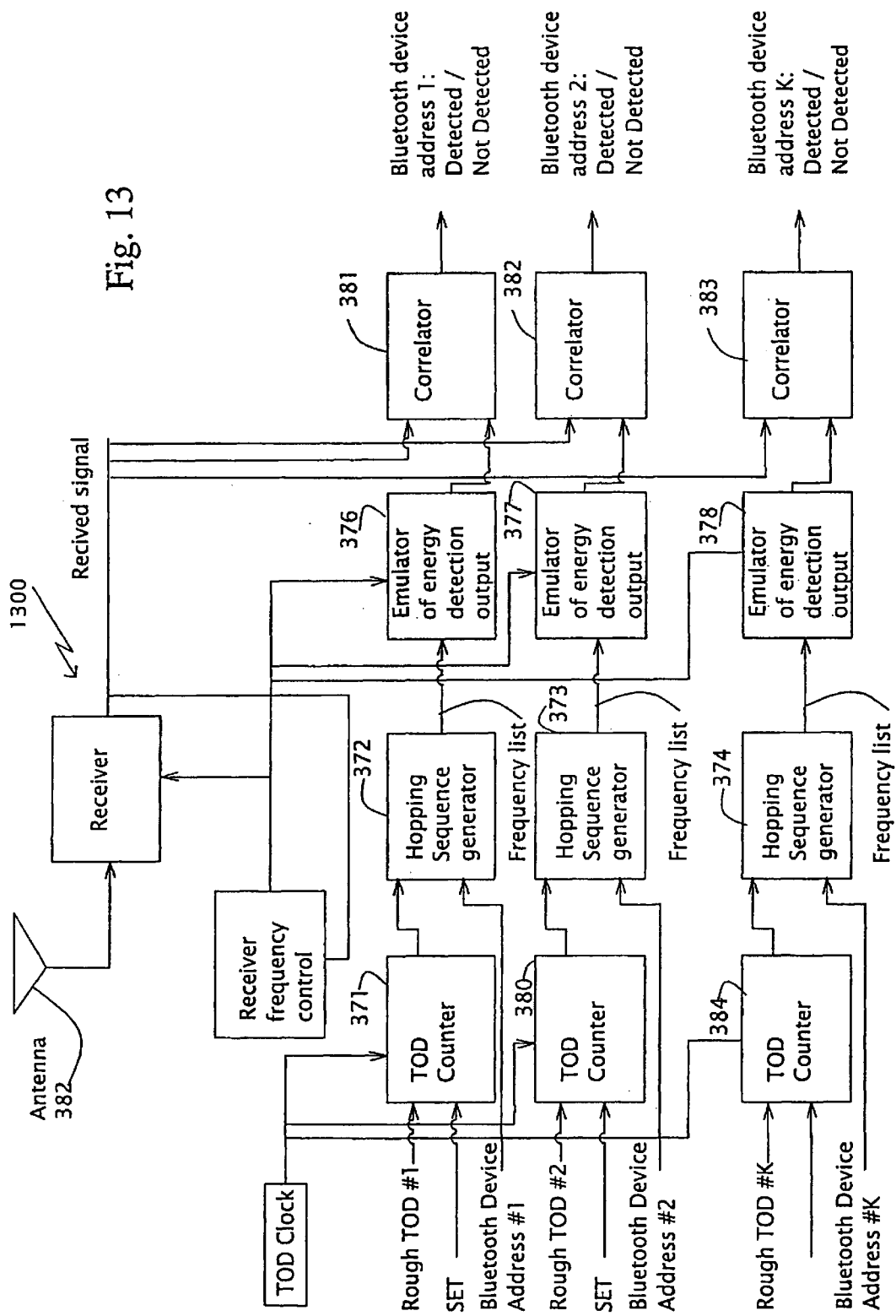

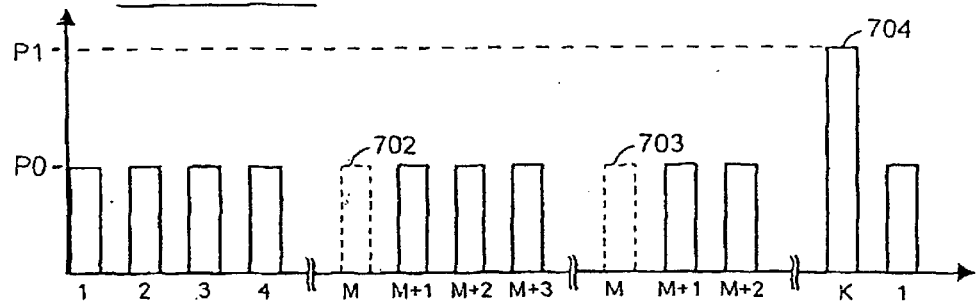
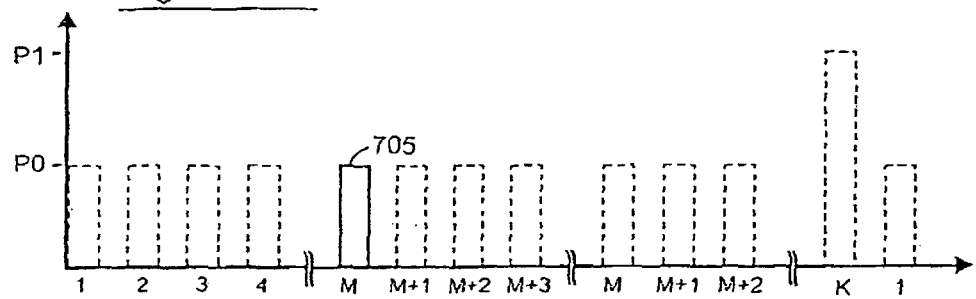
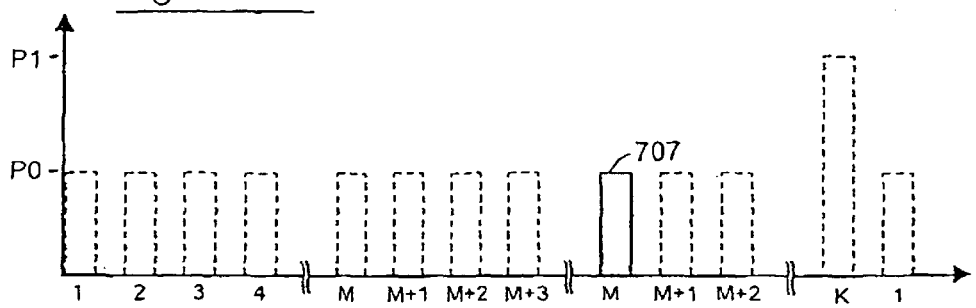

WIRELESS PRIVATE BRANCH EXCHANGE (WPBX) AND COMMUNICATING BETWEEN MOBILE UNITS AND BASE STATIONS

This Application is a Divisional of U.S. patent application Ser. No. 09/784,109 filed Feb. 16, 2001, currently pending, which claims benefit of provisional 60/195,219 Apr. 7, 2000 and claims benefit of provisional 60/208,306 Jun. 1, 2000.

TECHNICAL FIELD OF THE INVENTION

The invention relates to wireless communications systems having a plurality of mobile units (devices) having the ability to connect short-range with a plurality of Base Stations, and techniques for handing off a mobile unit from one Base Station to another when the mobile unit moves between areas of coverage of neighboring Base Stations.

BACKGROUND OF THE INVENTION

The effective range of a mobile device, such as a cordless handset, from its Base Station is limited by its transmission power and by the receiver sensitivity of the mobile device and the Base Station. Wireless Private Branch Exchange (WPBX) systems address this limitation by using more than one Base Station (BS). The area that a Base Station covers is called a cell. In the main, hereinafter, mobile units (devices) that are cordless (telephone) handsets are discussed.

In a WPBX, the Base Stations are interconnected in order to allow handsets that are in different cells to communicate with one another. When a handset moves from one cell to another during a call, the handoff (or handover) of communication from one Base Station to another Base Station enables uninterrupted communication. A central unit that is usually called the "Switch" is connected to all the Base Stations. The Switch controls the operation of the system, routes the call to Base Stations and to Gateways, which connect the WPBX to external communication systems. The transmission power of a cordless handset in the WPBX is usually lower than the transmission power of the handset of a standard cellular system, which results in a WPBX for cordless handsets having much smaller cells (referred to as mini-cells, or micro-cells or picocells) than the cells of a standard cellular system.

Some cordless handsets use communication protocols that are also used in cellular system, but they transmit in a lower power than a mobile (cellular) handset. For examples protocols in use are GSM and IS-136. According to these protocols the handoff between cells is performed by collaboration of the cordless handset, the Base Stations and the Switch. These handsets can connect to the WPBX when they are in its coverage area, and can also connect to any other cellular system that supports the communication protocol that they are using.

Some handsets use communication protocols that were designed especially to allow communication with WPBX. Some examples are DECT, CT-2, PAC, and PACS. The handset is usually a dedicated handset that is used only in the area covered by the WBPX.

Some handsets have dual mode support. For example a handset may communicate with the WPBX using DECT, and may allow communication with other cellular systems using GSM.

Some WPBXs use standard cordless handsets. These handsets have no special mechanism to support the handoff between cells. In these systems the Switch and the Base Stations perform the handoff, and the handset is not aware of (does not participate actively in) the handoff process. When a standard cordless handset moves from one cell to another the Switch routes the call to another cell. Since cordless phones use "simple" protocols, for example an analog fixed transmission, when the call is routed to the new cell, the cordless phone automatically will receive it.

During the last years short-range communication protocols have become much more complicated. Very low power is used in order to allow many systems to operate in close vicinity. Complex transmissions methods like frequency hopping and spread spectrum are used in order to overcome interference, and improve the communication quality. Digital communication methods are used allowing communication of data and voice on the same system. Error correction encoders are used in order to improve reliability. Security and privacy of the communication is improved with the use of Digital authentication and encryption.

Short-range communication systems are used for many purposes. A growing trend for short-range communication usage is Personal Area Network (PAN) devices and applications, among such is the "all in one handset" and personal data devices. Such type of handset supports standard cellular communication, and also has the ability to communicate with personal area network devices that are in its near vicinity, using short-range communication. Some PAN short-range communication standards were not designed to allow mobility, i.e. they were not designed to allow handoff in between Base Stations in general and during an active session in particular. This limits a session via such device to be linked to a single Base Station and therefore to very limited area.

The "Bluetooth" standard is a short-range wireless communication standard that has many uses for voice applications and telephony (e.g. cordless phone, wireless headsets) and also for data applications (laptop to personal computer communication, wireless local area network Gateways etc.). The Bluetooth wireless technology is implemented using a universal radio interface in the 2.45 GHz frequency band that enables portable electronic devices to connect and communicate wirelessly via short-range, ad hoc networks. Each unit can simultaneously communicate with up to seven other units per piconet. Moreover, each unit can simultaneously belong to several piconets.

Bluetooth connection is planned to be standard feature in future cellular handsets, Personal Digital Assistants (PDAs), Palmtop and Laptop computers. The Bluetooth standard does not support mobility between Base Stations, since it was primarily designed for short-range communication as a cable replacement. A cellular handset with Bluetooth wireless technology will be able to operate as a cordless phone, but only in the near vicinity of a single Base Station. The same limitation applies to mobile personal data devices such as PDA's and mobile computers.

Glossary

Unless otherwise noted, or as may be evident from the context of their usage, any terms, abbreviations, acronyms or scientific symbols and notations used herein are to be given their ordinary meaning in the technical discipline to which the invention most nearly pertains. The following glossary of terms is intended to lend clarity and consistency to the various descriptions contained herein, as well as in prior art documents:

| | |
|---|---|
| ATM | Asynchronous Transfer Mode |
| BER | Bit Error Rate |
| Bluetooth | short-range wireless communications standard/interface/protocol |
| BS | Base Station |
| CPU | Central Processing Unit |
| CRC | Cyclic Redundancy Check. |
| CT-2 | a communication protocol |
| DECT | Digital Enhanced Cordless Telephone communication protocol |
| DN | Destination Number |
| ECHO | a response to a PING |
| FIFO | First In, First Out |
| FTP | File Transfer Protocol |
| Gateway | an interface for communications between dissimilar services |
| GHz | GigaHertz |
| GSM: | Global System for Mobile Communication |
| handoff | transfer of mobile devices from one Base Station to another Base Station |
| ID | Identification (number) |
| IEEE 802.2 | Ethernet protocol |
| IS-136 | communication protocol |
| ISDN | Integrated Services Digital Network |
| ITU-T 802.15 | a communication standard similar to the Bluetooth standard |
| ITU-T Q.931 | a telephony protocol for call setup |
| IVR | Interactive Voice Response |
| LAN | Local Area Network |
| LMSE | Least Mean Square Error |
| MSC | Mobile Switching Center (MSC) |
| PAC | a communication protocol |
| PACS | a communication protocol |
| PAN | Personal Area Network |
| PBX | Private Branch Exchange |
| PABX | Private Automatic Branch Exchange (also referred to as PBX) |
| PDA | Personal Digital (or Data) Assistant |
| picocell | a coverage area of a short-range Base Station |
| PING | a command which is sent, soliciting a response |
| PPP | Point-To-Point Protocol |
| PSTN | Public Switched Telephone Network |
| RF | Radio Frequency |
| SNR | Signal-to-Noise Ratio |
| Switch | Apparatus for routing telephone calls |
| TOD | Time Of Day |
| WAP | Wireless Application Protocol |
| WPBX | Wireless Private Branch Exchange |

SUMMARY OF THE INVENTION

A general object of the invention is to provide a technique for allowing mobile units (devices) such as standard cordless telephone handsets and PDA (Personal Digital Assistant), laptop or notebook computers or similar devices that support wireless communication (such as Bluetooth wireless technology) to seamlessly connect to a Wireless Private Branch Exchange (WPBX), or to a standard (wired) PBX or to a LAN or to a cellular telephone network or to a standard wired telephone network, thereby avoiding the use of special (typically expensive) handsets or attachments or software or hardware agents, with the abovementioned mobile devices.

According to the present invention there is provided, in a wireless communication system comprising at least two Base Stations, at least one Switch in communication with the Base Stations, a method of communicating between mobile units and the Base Stations comprising: dividing a communication protocol into a low-level protocol for performing tasks that require accurate time synchronization and a high-level protocol which does not require accurate time synchronization; and for each connection of a mobile unit with a Base Station, running an instance of the low-level protocol at the Base Station connected with the mobile unit and running an instance of the high-level protocol at the Switch.

According to the present invention there is provided, in a wireless communication system comprising a Base Station connected with a mobile unit, a method of synchronizing at least one neighboring Base Station to the Base Station connected with the mobile unit comprising: from the Base Station connected with the mobile unit, sending call parameters and rough synchronization information to the at least one neighboring Base Station; and at the at least one neighboring Base Station, monitoring transmissions of at least one of: the Base Station connected with the mobile unit; the mobile unit; and a beacon signal from a beacon transmitter which is within range of the at least one neighboring Base Station and the Base Station connected with the mobile unit.

According to the present invention there is provided, in a wireless communication system comprising a plurality of Base Stations and at least one Switch in communication with the Base Stations, a method of synchronizing at least one neighboring Base Station to a Base Station connected with a mobile unit comprising: from the Base Station connected with the mobile unit, periodically transmitting during a selected time interval with higher transmission power than during normal transmission; and receiving the transmission with higher transmission power at the least one neighboring Base Station.

According to the present invention there is provided, in a wireless communication system comprising a Base Station connected with a mobile unit, a method of detecting the presence of a specific mobile unit in a coverage area of at least one neighboring Base Station, comprising: the Base Station connected with the mobile unit provides, to the at least one neighboring Base Station, information about the connection with the mobile unit, including rough TOD and a device address for the mobile unit; at the at least one neighboring Base Station, receiving information and generating a list of frequencies in which the mobile unit is likely to transmit; and at the at least one neighboring Base Station, checking for a signal transmitted by the mobile unit.

According to the present invention there is provided a method for detecting a mobile unit by a Base Station, wherein frequency-hopping is used to communicate between Base Stations and mobile units, comprising: at a Base Station that is connected to a mobile unit, periodically yielding a hop; and during the hop which has been yielded by the Base Station connected with the mobile unit, communicating with the mobile unit from at least one neighboring Base Station.

According to the present invention there is provided, in a wireless communication system comprising a Base Station connected with a mobile unit, a method of detecting a handset by at least one Base Station which is waiting for the mobile unit to enter its coverage area, comprising: from the at least one Base Station waiting for the mobile unit to enter its coverage area and the Base Station connected with the mobile unit, sending a PING command to the mobile unit; and at the Base Station waiting for the mobile unit to enter its coverage area, receiving an ECHO reply from the mobile unit.

According to the present invention there is provided, in a wireless communication system comprising at least two Base Stations, at least one Switch in communication with the Base Stations, and at least one mobile unit, a method of handing off the mobile unit from a Base Station communicating with the mobile unit and a neighboring Base Station, comprising: smoothing a plurality of signals received from a handset by a plurality of Base Stations; comparing the signals with one another; and selecting a Base Station for handoff based on signal quality.

According to the present invention there is provided, in a wireless communication system comprising at least two Base Stations and at least one Switch in communication with the Base Stations, a method of performing handoff of a session from a Base Station connected with a mobile unit to a neighboring Base Station, wherein an instance of a low-level communications protocol is running at the Base Station connected with the mobile unit, comprising: at the Switch, determining when to perform handoff to a selected one of the neighboring Base Stations; at the selected one of the neighboring Base Stations, creating a copy of the low-level communications protocol, including at least a synchronized time of day (TOD) parameter; from the Switch, sending a command to stop communication with the mobile unit at a specified TOD to the Base Station connected with the mobile unit and sending a command to start communication with the mobile unit at the specified TOD to the selected one of the neighboring Base Stations; and updating session status tables in the Switch and in the Base Stations.

According to the present invention there is provided, in a wireless communication system comprising a Base Station connected with a mobile unit, a method of detecting and synchronizing with the mobile unit prior to receiving a handoff of a session with the mobile unit, comprising: from the Base Station connected with the mobile unit, sending rough synchronization information to at least one neighboring Base Station; at the neighboring Base Station, performing a wide-range search for "target" signals having the correct timing for a mobile unit, based on the rough synchronization information provided by the Base Station which is connected with the mobile unit; narrowing the search for an actual signal from the mobile unit; acquiring the target signal; and synchronizing the neighboring Base Station to the Base Station connected with the mobile unit.

According to the present invention, a system comprises one or more mobile units such as standard cordless handsets, two or more Base Stations, and at least one Switch. The Base Stations are connected to one another and to the Switch. The handsets communicate directly with the Base Stations, rather than with one another.

According to an aspect of the present invention, the Base Stations and Switch communicate directly with one another, rather than, for example, over the PSTN. However, the system may interface with the PSTN, the Internet or a LAN, or with a PBX via a Gateway.

According to a feature of the present invention, a method is provided for handing off calls from a one Base Station to another (neighboring) Base Station, with mobile units (e.g., standard cordless handsets) that do not support connection to more than one Base Station and that do not support mobility with seamless handoff between Base Stations. This is an important feature because the mobile device uses complicated digital communication methods, so simple handoff methods that only the Switch supports are inadequate. Rather, the Switch and Base Stations cooperate with one another for the handoff operation. Accurate synchronization of Base Stations facilitates handoff. Advantageously, the handoff operation does not require explicit cooperation between the mobile device and the Base Stations.

According to an aspect of the present invention, a method is provided for dividing the short-range communication protocol that is used by the handset between high-level protocols which do not need accurate time synchronization and low-level protocols which have strict time synchronization requirements (require accurate time synchronization). The low-level protocols are performed by the Base Stations, and the high-level protocols are performed in the Switch. This enables handoff to be performed even when complex (e.g. frequency hopping, encryption, authentication) and multi-level protocols are used. This also reduces the synchronization requirements between Base Stations.

According to an aspect of the present invention, a method is provided for accurately synchronizing the Base Stations and, more particularly, for synchronizing the Base Stations when frequency-hopping communication is used.

According to an aspect of the present invention, a method is provided for detecting the presence of a mobile device in the coverage area of a Base Station (i.e., its picocell).

According to an aspect of the present invention, a method is provided for determining when to perform handoff of a session(i.e., a phone call, a data link, etc.), and to which Base Station to hand the session, by measuring signal quality at the Base Stations. This method is effective, even when complex transmission methods are used.

The methods disclosed herein are not limited to the communication of a certain type of data. Hence, they can be utilized for telephony applications and for data applications.

Other objects, features and advantages of the invention will become apparent in light of the following description thereof.

BRIEF DESCRIPTION OF THE DRAWINGS

Reference will be made in detail to preferred embodiments of the invention, examples of which may be illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

In flowcharts presented herein, rectangular boxes generally represent a sequential step being performed, a diamond shaped box generally represents a decision step (test) having two mutually-exclusive results ("Y"=Yes; "N"=No), and an empty circle is not a step or a test, but is merely a graphical junction point at which two or more paths in the flowchart converge.

Figure 1:
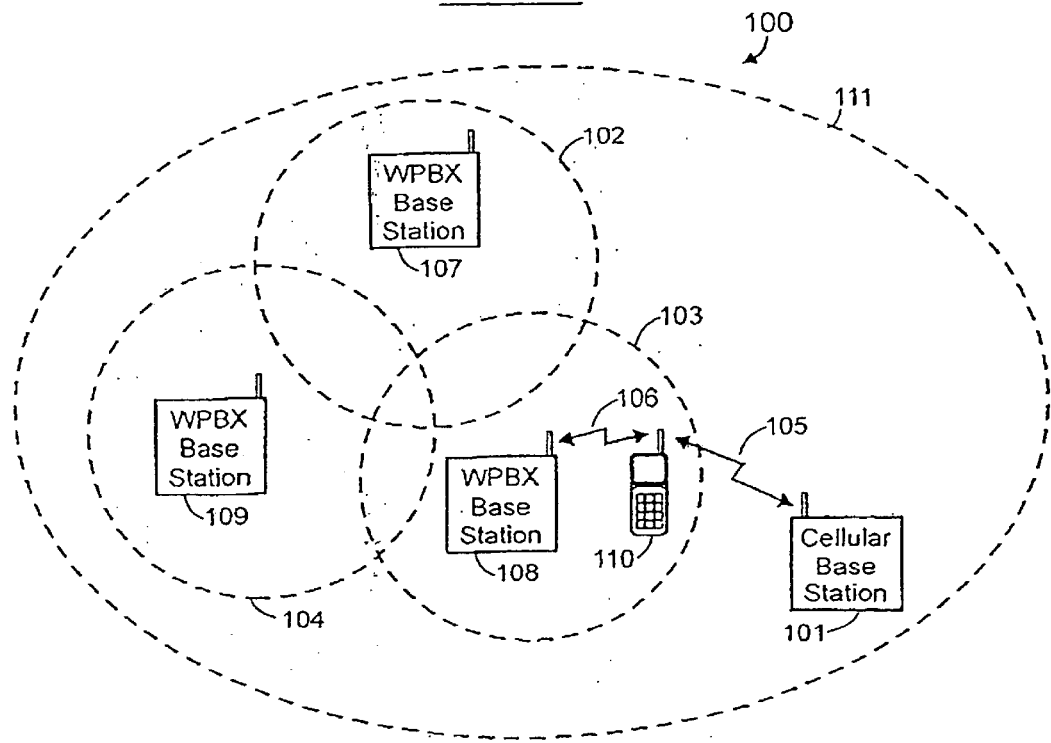
Figure 2:
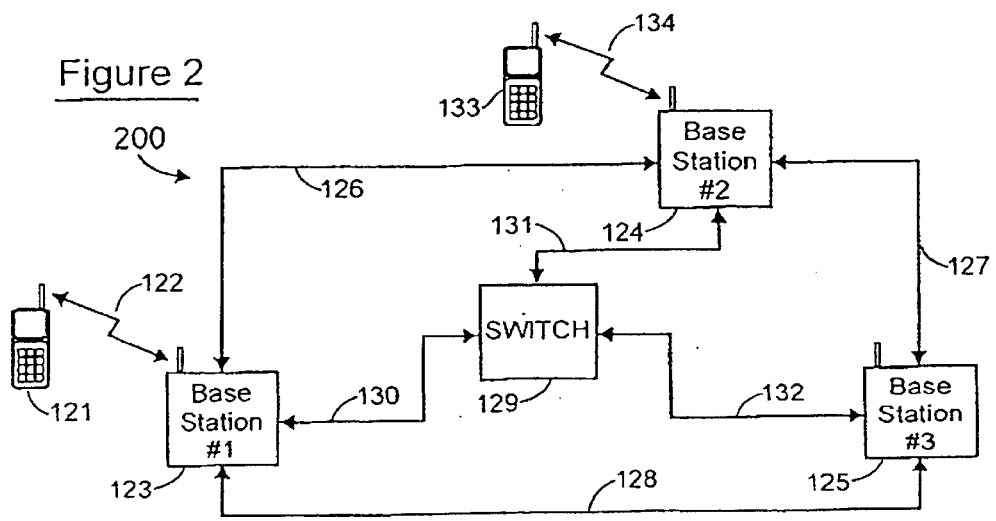
Figure 3A:
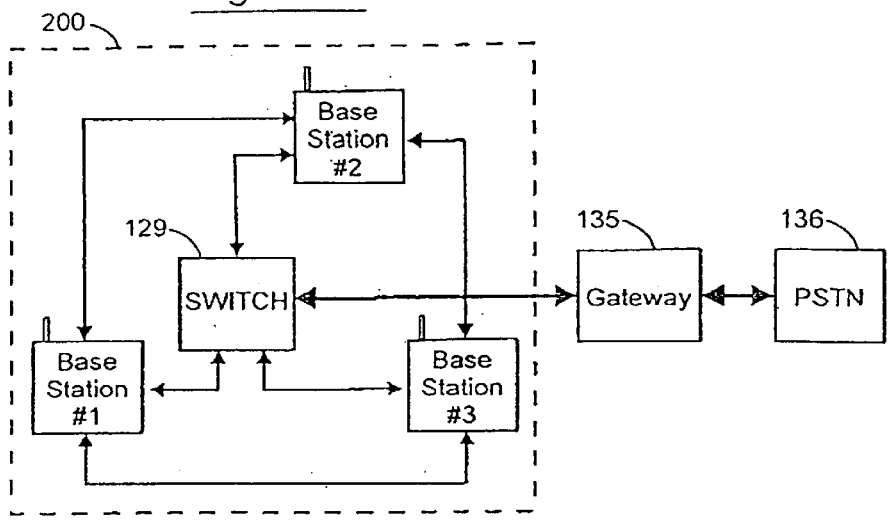
Figure 3B:
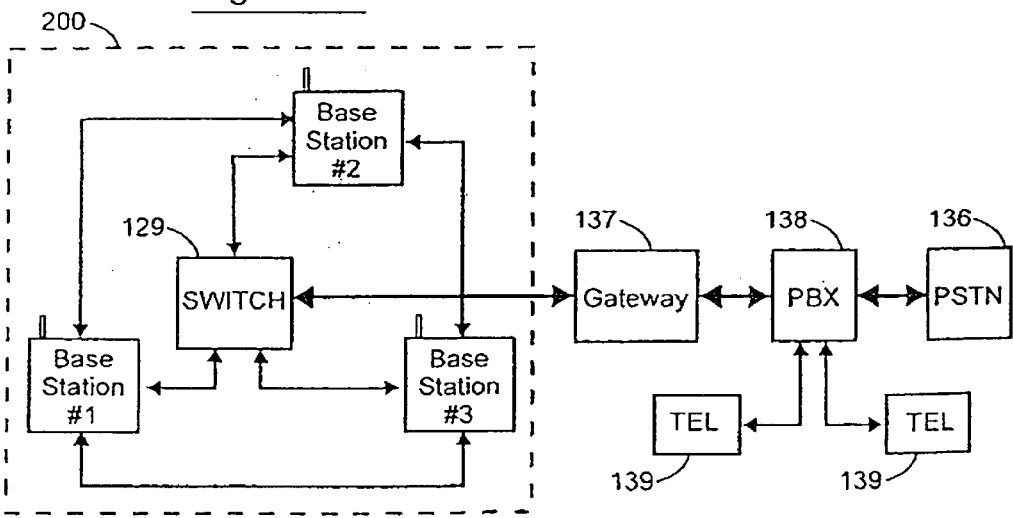
Figure 4:
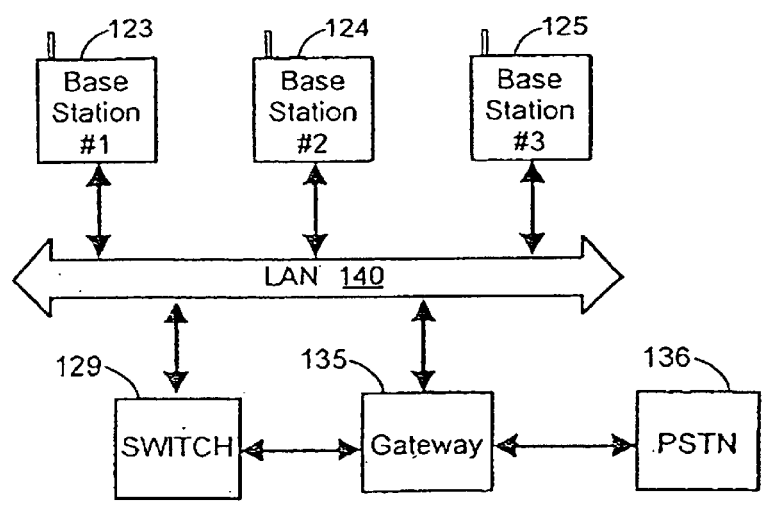
Figure 22:
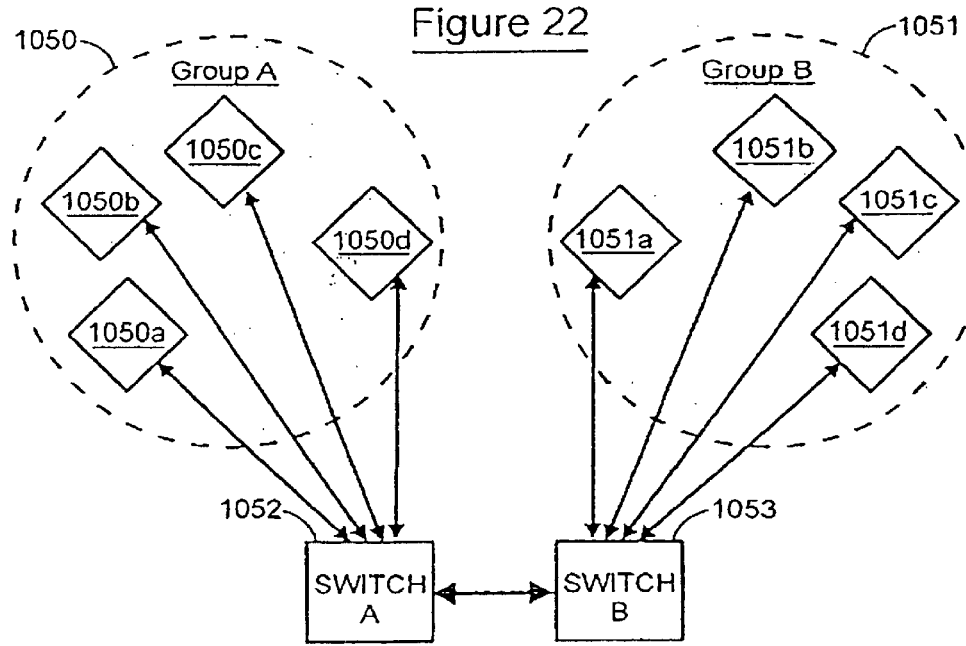
Figure 5:
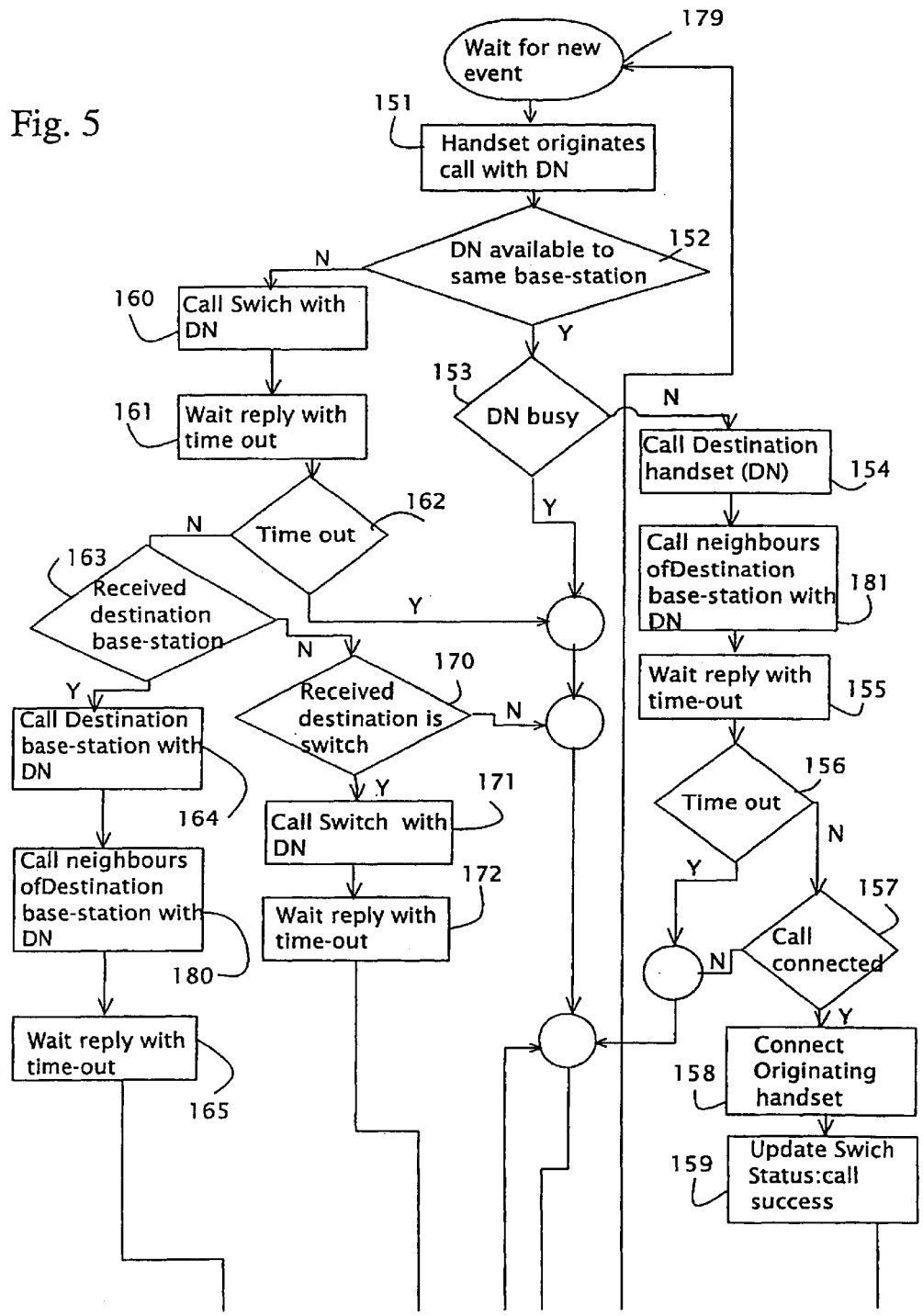
Figure 5:
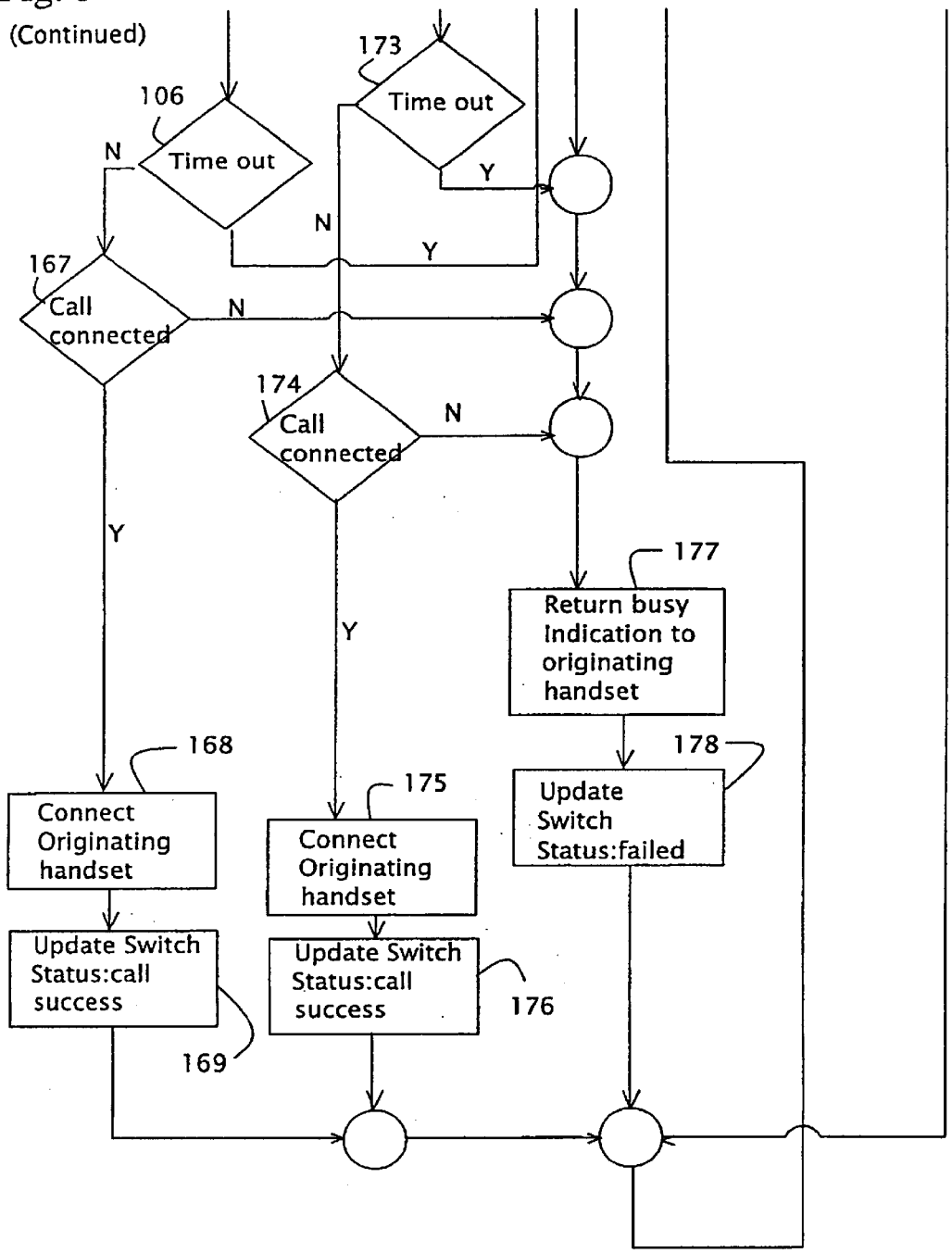
Figure 6:
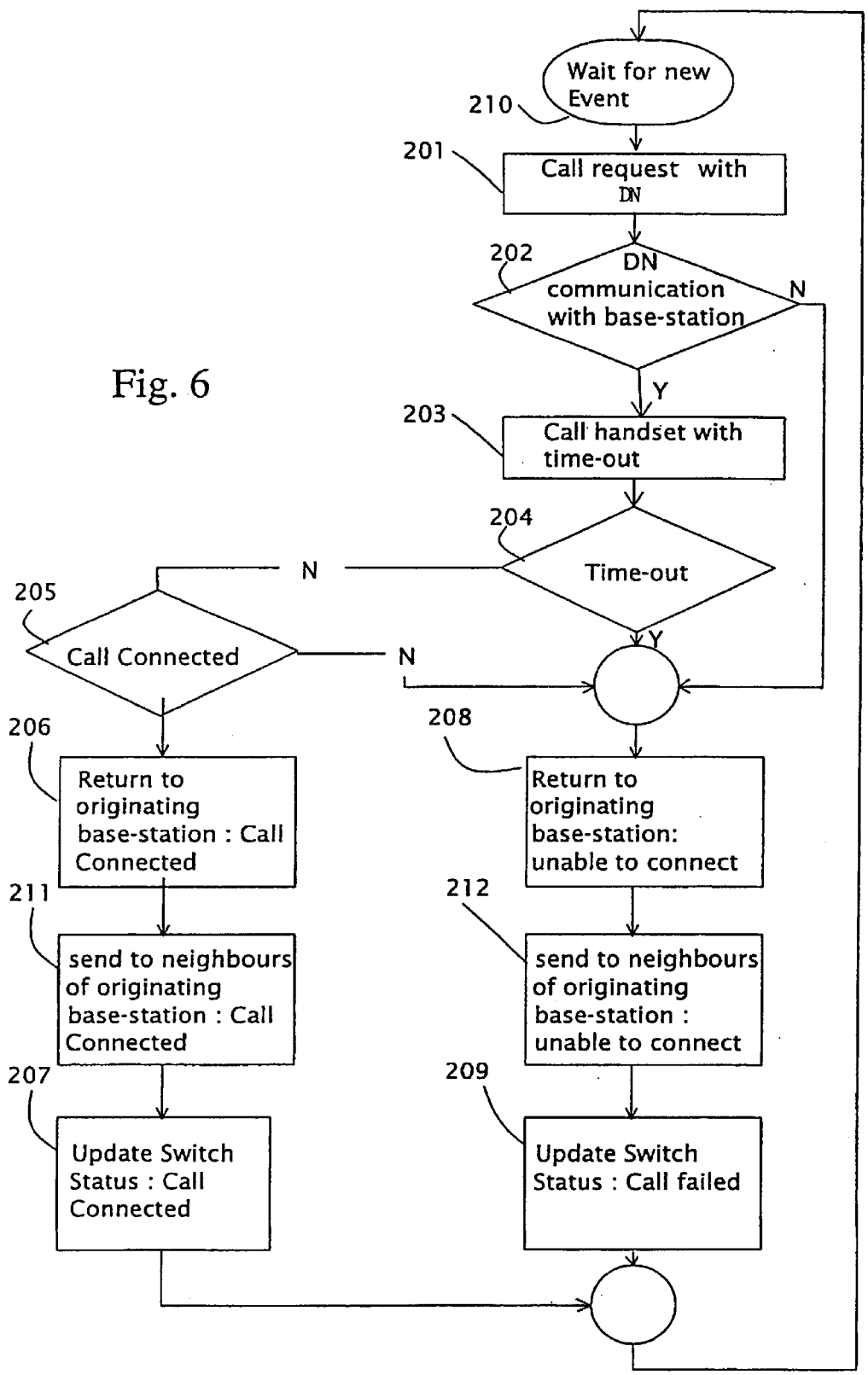
Figure 7:
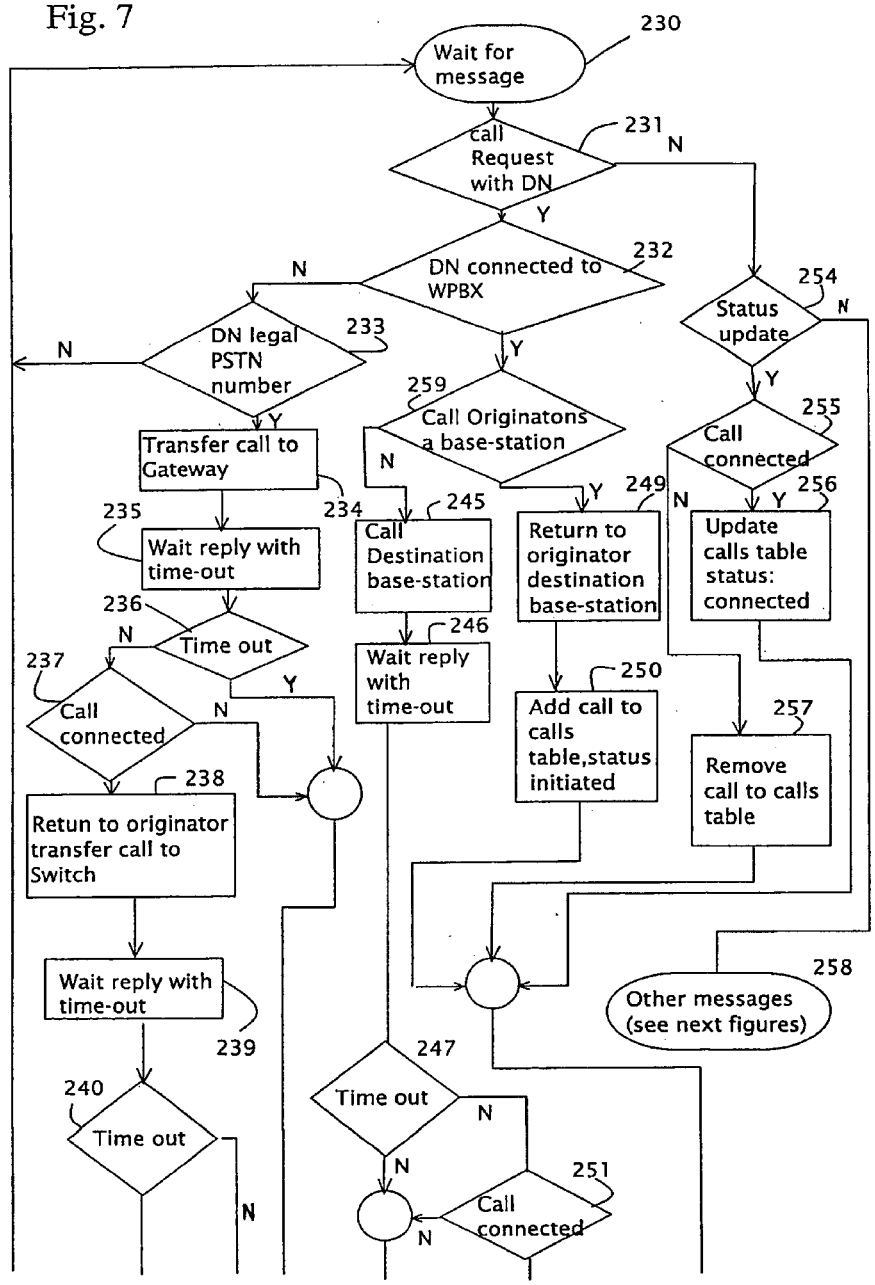
Figure 7:
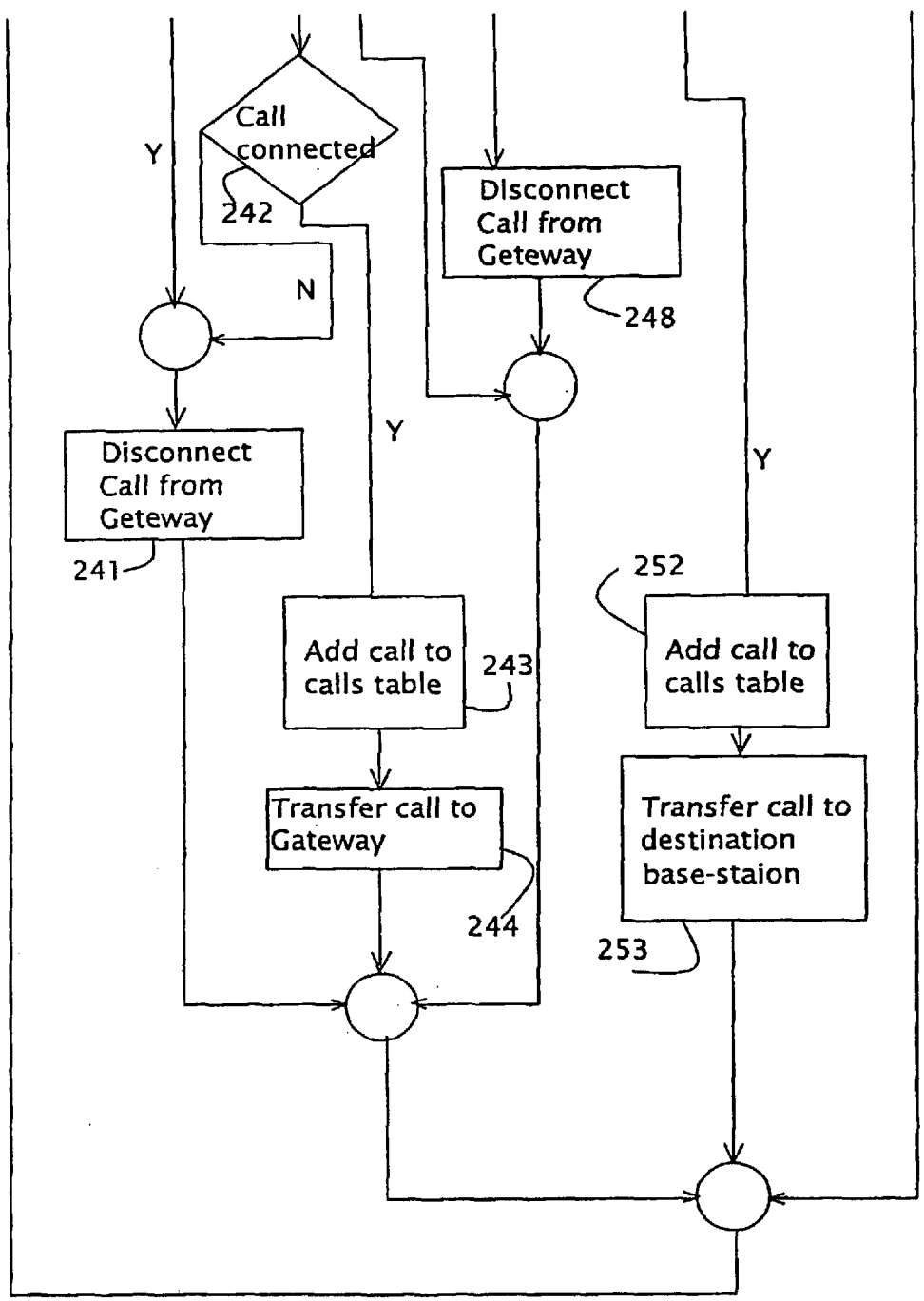
Figure 8A:
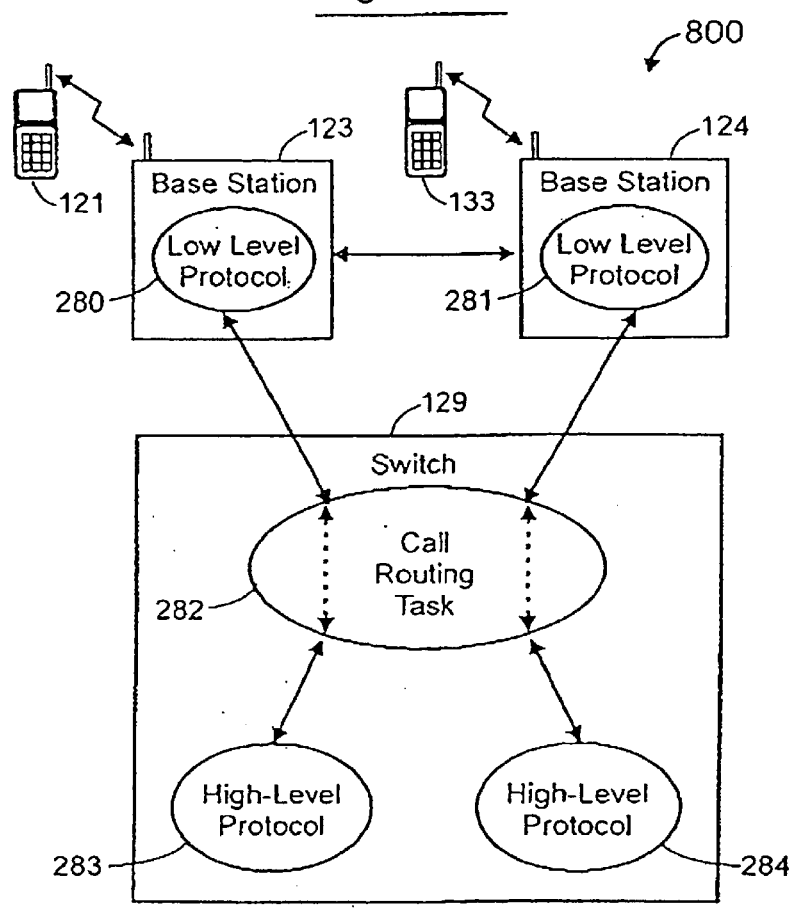
Figure 8B:
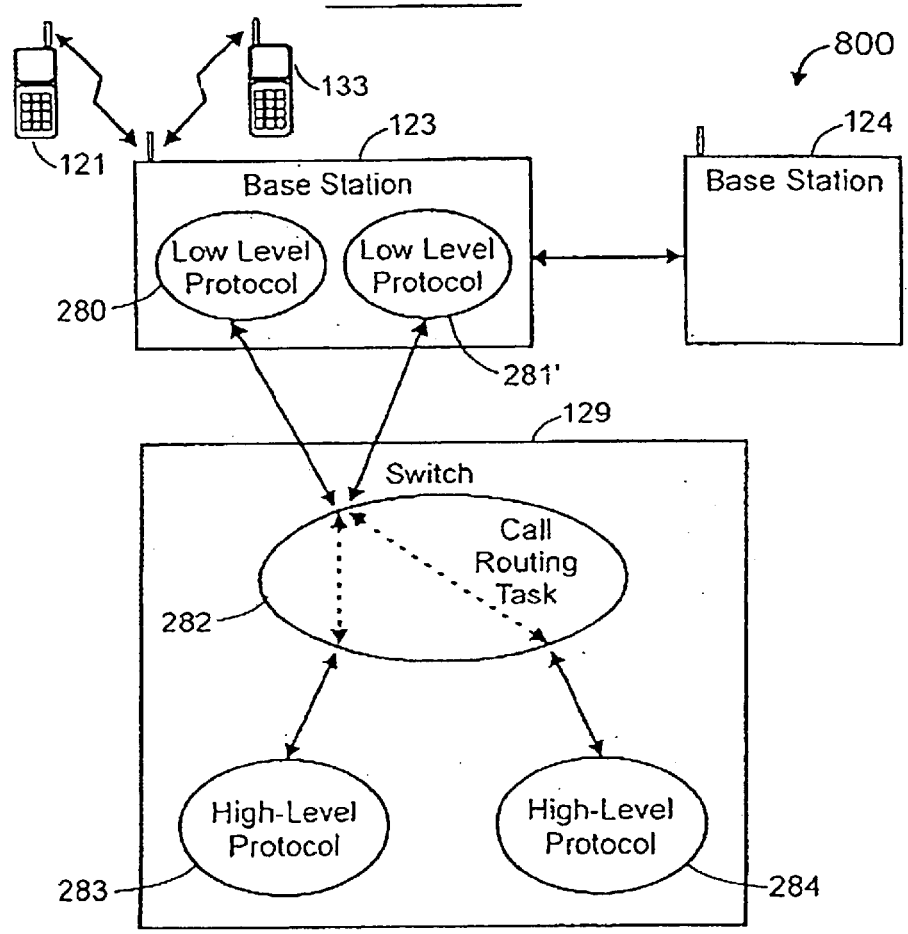
Figure 10:
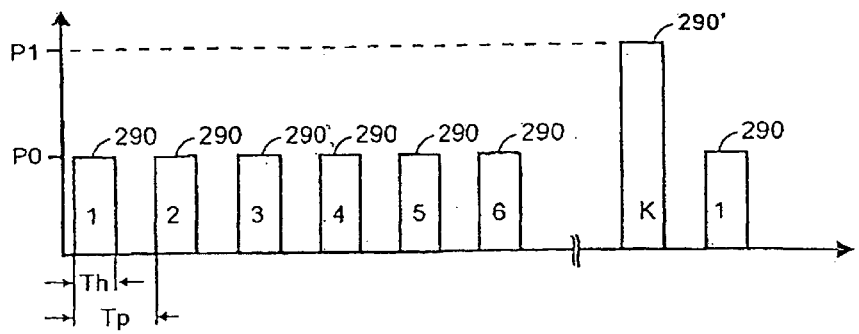
Figure 11:
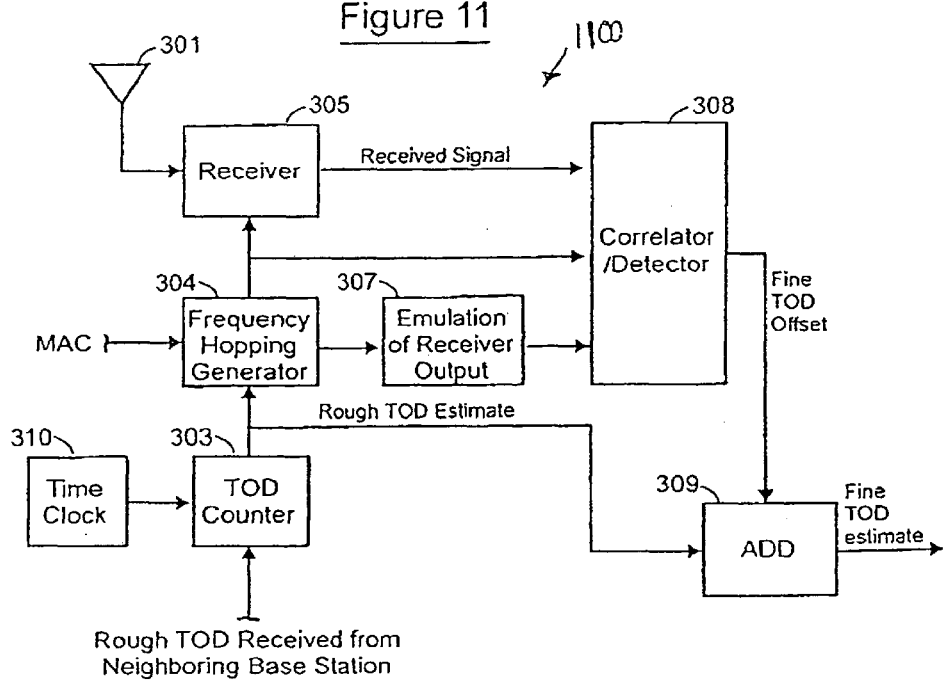
Figure 12:
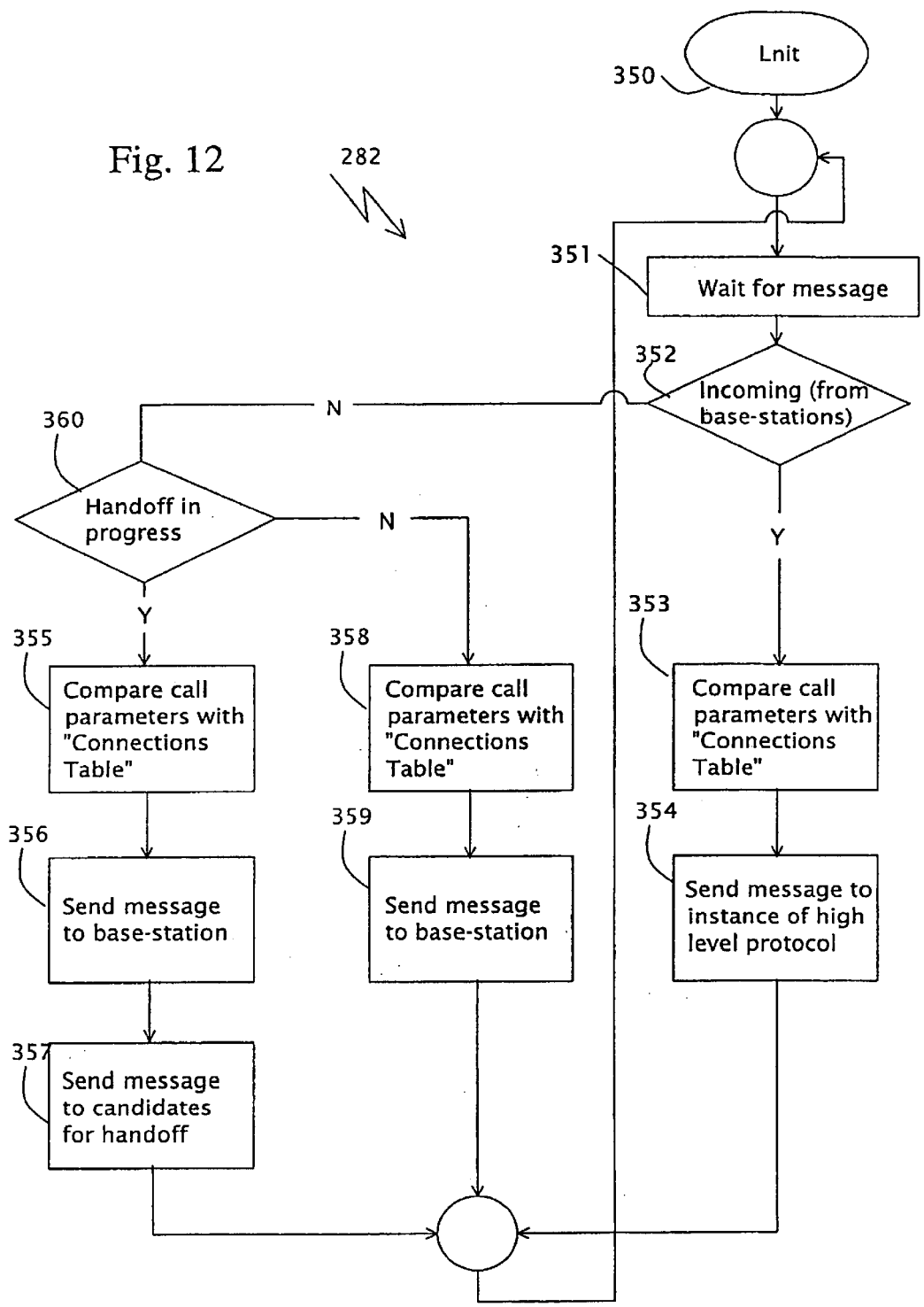
Figure 14A:
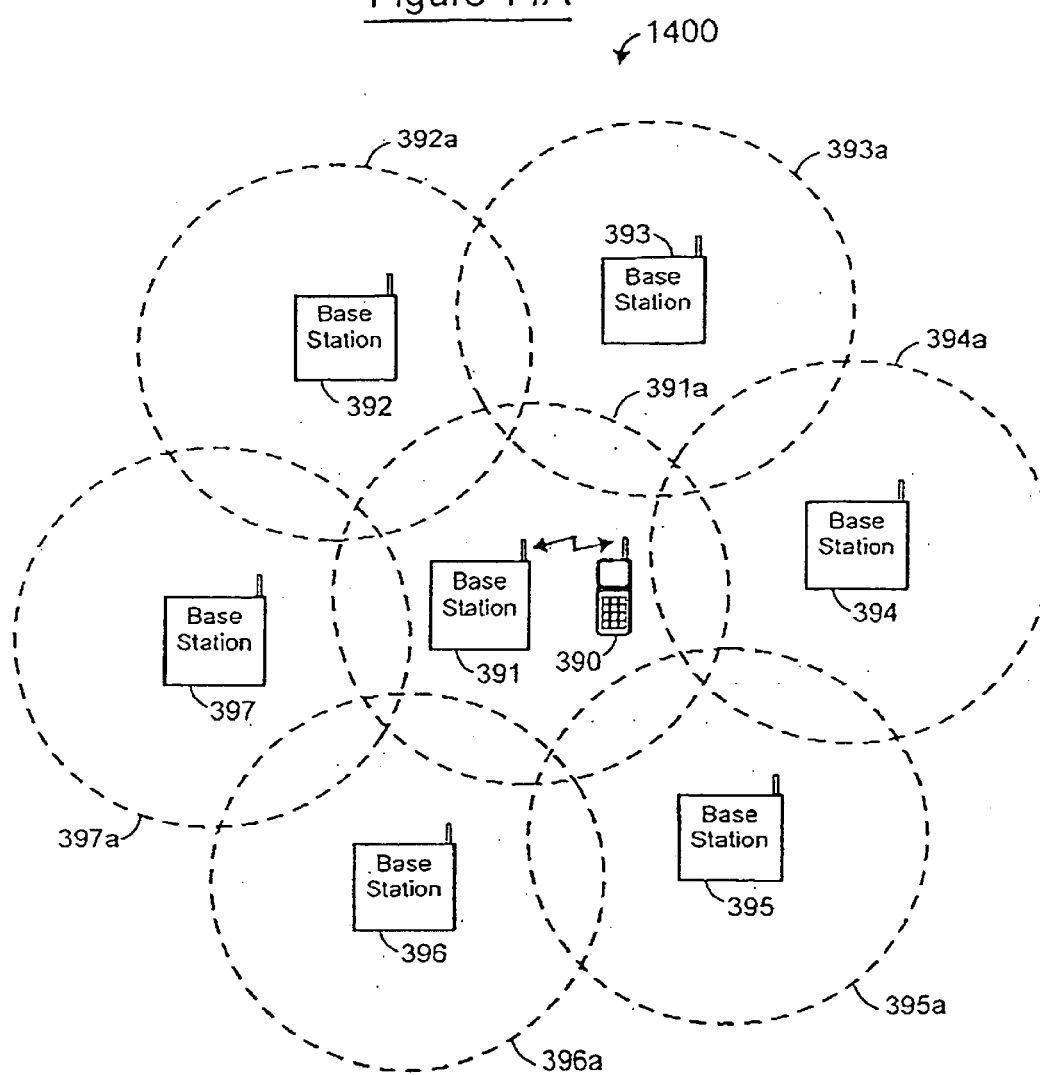
Figure 15A:
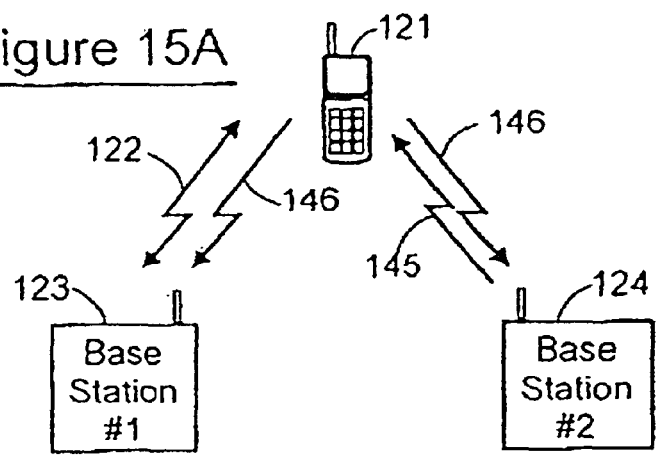
Figure 15B:
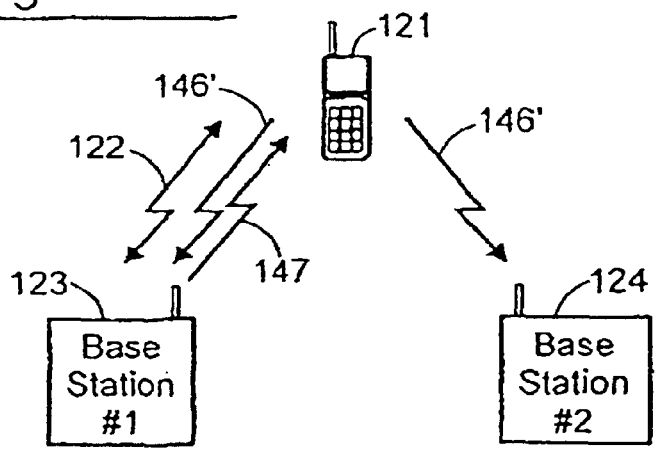
Figure 16A:
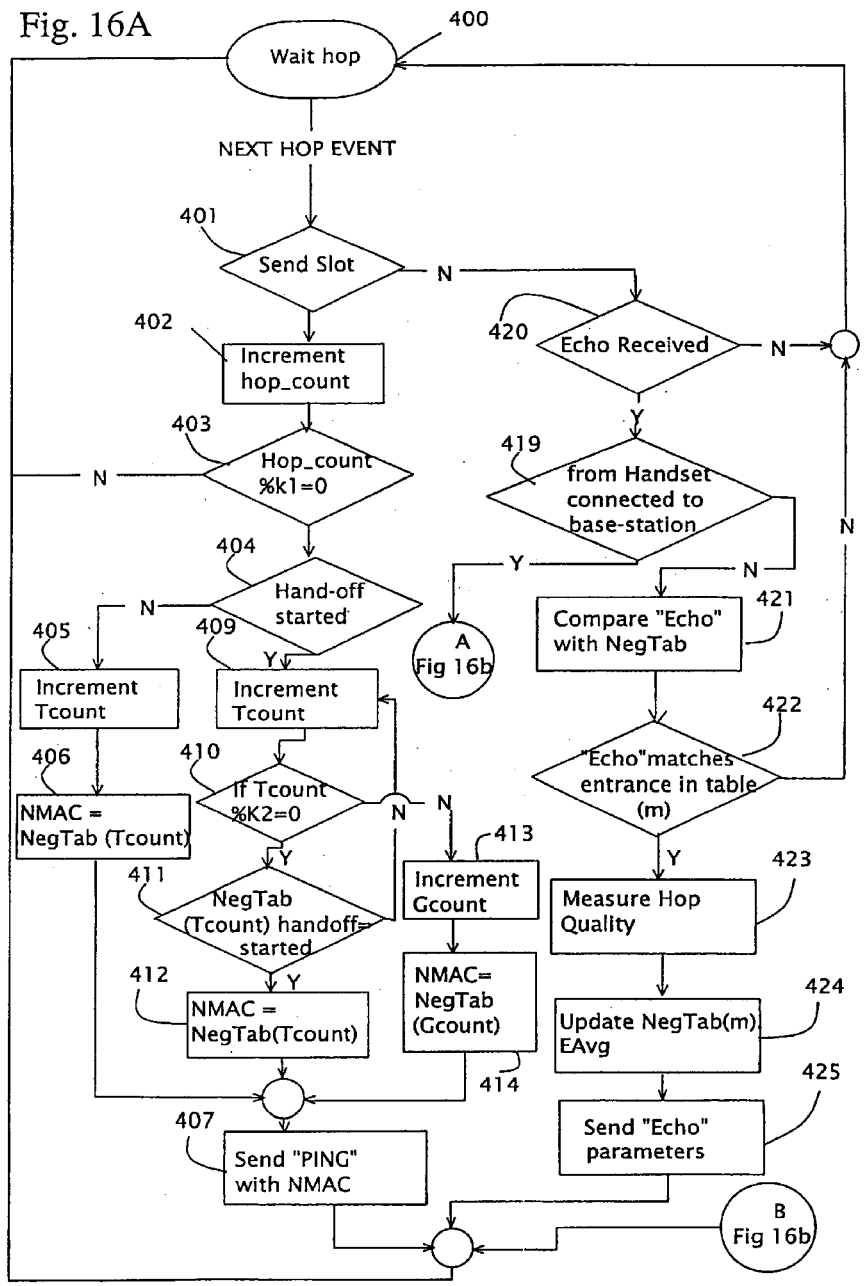
Figure 16B:
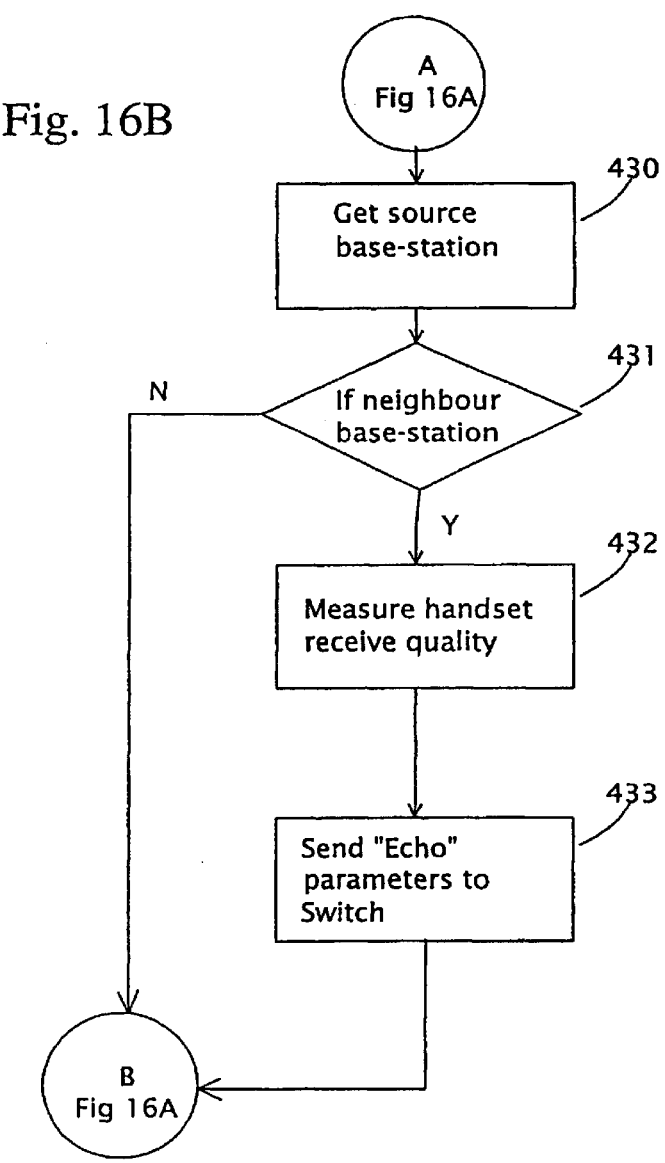
Figure 17A:
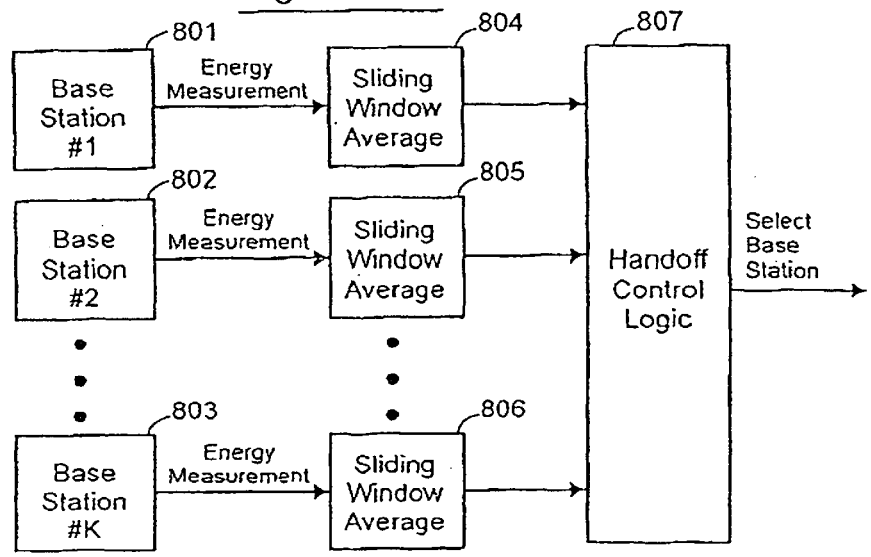
Figure 17B:
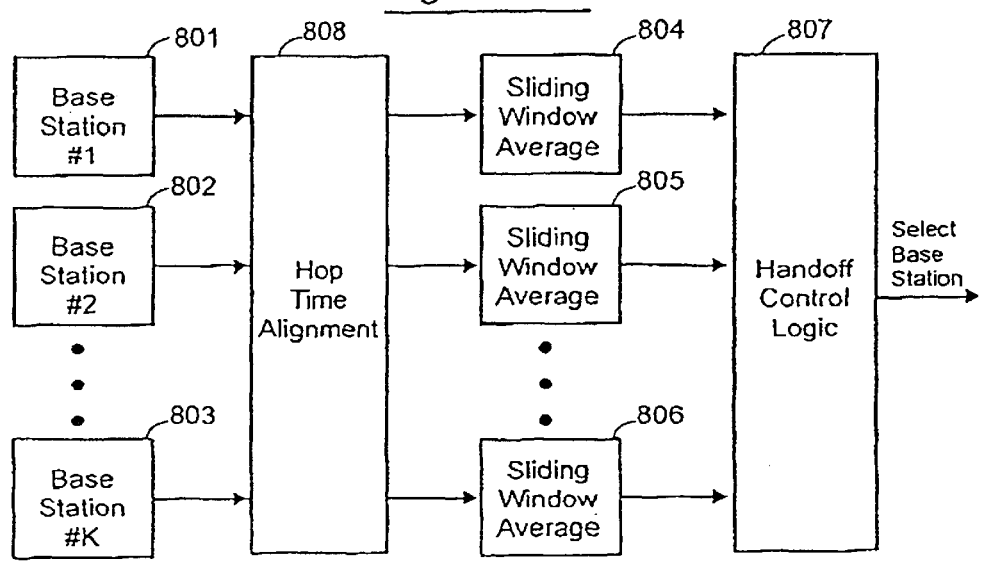
Figure 18:
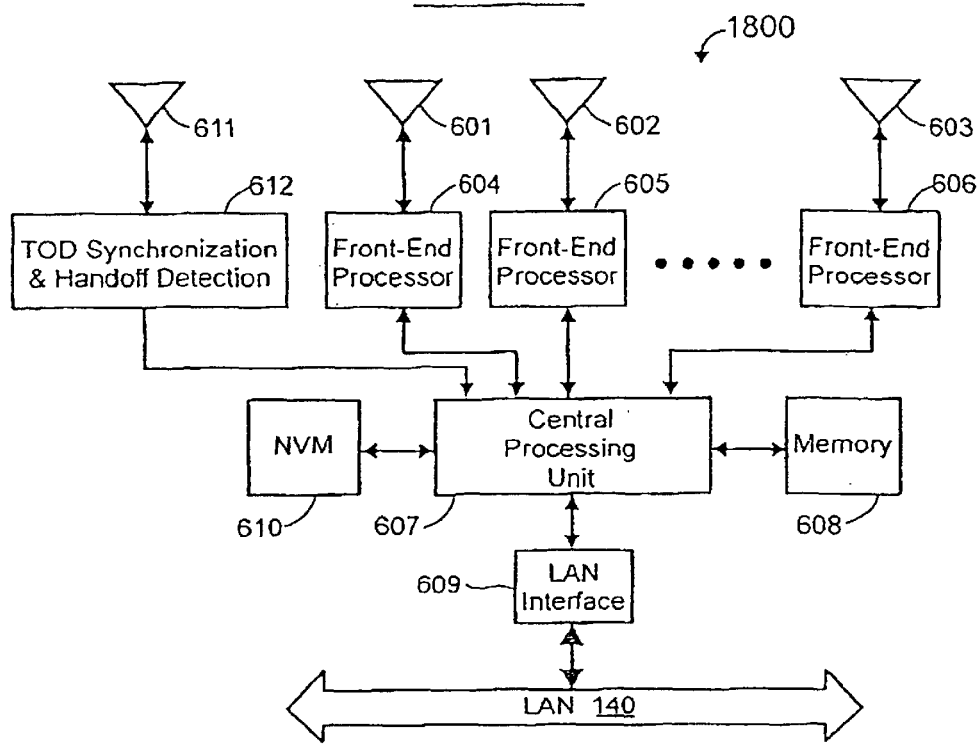
Figure 19:
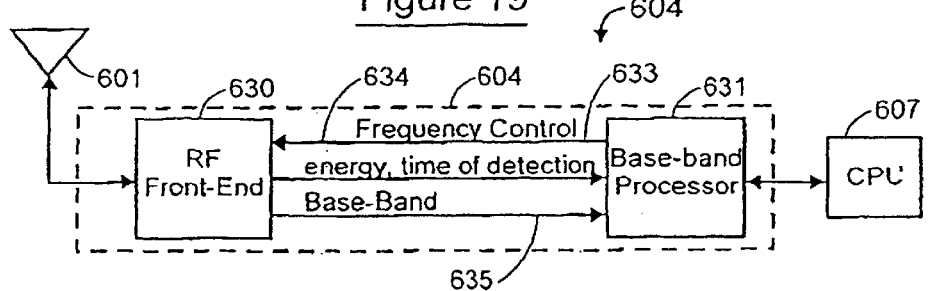
Figure 20:
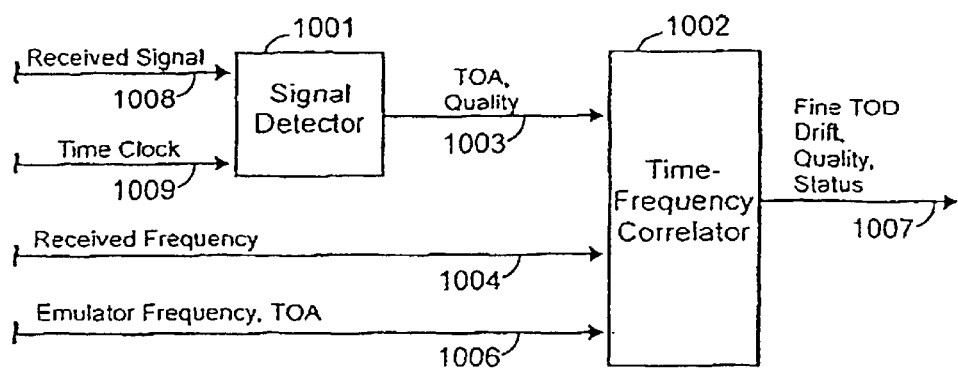
Figure 21:
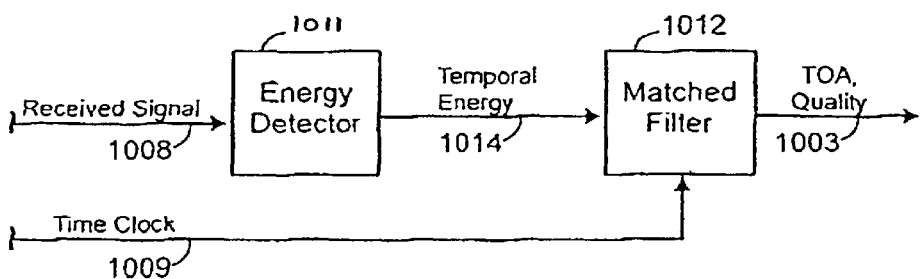

The structure, operation, and advantages of the present preferred embodiment of the invention will become further apparent upon consideration of the following description, taken in conjunction with the accompanying figures, wherein:

FIG. 1 is a diagram of a cellular system covering a relatively large area and a Wireless Private Branch Exchange (WPBX) system covering a relatively smaller area, illustrating that a cellular handset can communicate with a Base Station of the cellular system and also with Base Stations of the WPBX;

FIG. 2 is a schematic block diagram illustrating main components and architecture of a WPBX system, suitable for use as the WPBX system of FIG. 1;

FIG. 3A is a schematic block diagram of a communications system incorporating a WPBX, such as the WPBX of FIG. 2, with the addition of a Gateway connecting the WPBX to the Public Switched Telephone Network (PSTN);

FIG. 3B is a schematic block diagram of a communications system incorporating a WPBX, such as the WPBX of FIG. 2, with the addition of a Gateway connecting the WPBX to a Private Branch Exchange (PBX);

FIG. 4 is a schematic block diagram illustrating an architecture for a WPBX, with the Base Stations, the Switch and the Gateway interconnected by a local area network (LAN);

FIG. 5 is a flowchart illustrating a procedure for call "setup" at an originating Base Station of a WPBX;

FIG. 6 is a flowchart illustrating a procedure for call "setup" at a receiving Base Station of a WPBX;

FIG. 7 is a flowchart illustrating a procedure for call "setup" at a Switch of a WPBX;

FIGS. 8A and 8B are schematic block diagrams illustrating an architecture for dividing the communication protocol into low-level and high-level protocols for implementation in the Base Stations and in the Switch, respectively, of a WPBX particularly during a handoff, according to the invention;

FIGS. 9A, 9B and 9C are schematic block diagrams illustrating rough and fine synchronization of Base Stations in a WPBX, particularly during a handoff, according to the invention;

FIG. 10 is a graph of a Base Station's transmission power, during hops, illustrating that once in every K hops the energy that the Base Station transmits may be increased to allow other Base Stations that normally do not receive transmissions from the transmitting Base Station to synchronize to the transmitting Base Station, according to the invention;

FIG. 11 is a schematic block diagram illustrating an architecture for major components of a Base Station, according to the invention;

FIG. 12 is a flowchart illustrating a "call routing task" that runs in the Switch in order to isolate the high-level protocols from the occurrence of the handoff, according to the invention;

FIG. 13 is a schematic block diagram illustrating a passive method for detecting arrival of a handset in a Base Station's coverage area during a call, according to the invention;

FIG. 14A is a diagram illustrating a handset communicating with one Base Station, and six other neighboring Base Stations waiting for the handset to enter their coverage area, according to the invention;

FIGS. 14B, 14C and 14D are graphs illustrating transmissions by the Base Station communicating with the handsets, and by the neighboring Base stations, according to the invention;

FIGS. 15A and 15B are diagrams illustrating detection of a handset by a Base Station in communication with the handset and a neighboring Base Station, according to the invention;

FIG. 16A is a flowchart illustrating a procedure that Base Stations may use to detect a handset that enters their coverage area, according to the invention;

FIG. 16B is a flowchart illustrating a procedure that Base Stations may use to determine that a handset connected to them is moving into the coverage area of another Base Station, according to the invention;

FIG. 17A is a schematic block diagram illustrating a method for making a handoff decision, performed in the central Switch, when a passive detection method is used, according to the invention;

FIG. 17B is a schematic block diagram illustrating a method for making a handoff decision, performed in the central Switch, when an active detection method is used, according to the invention;

FIG. 18 is a schematic block diagram of a Base Station comprising a central processing unit (CPU), front end processors, memory, TOD synchronization and handset detection unit, and an interface to a local area network (LAN), according to the invention;

FIG. 19 is a schematic block diagram illustrating the front-end processor of the Base Station of FIG. 18, which comprises a base-band processor and a radio frequency (RF) front end, according to the invention;

FIG. 20 is a schematic block diagram illustrating the structure of a detector and fine TOD estimator, based on a matching correlator, according to the invention;

FIG. 21 is a schematic block diagram of an implementation for the Time-Frequency Correlator of FIG. 20, according to the invention;

FIG. 22 is a diagram illustrating an implementation of a WPBX system with two Switches, according to the invention.

Figure 23:
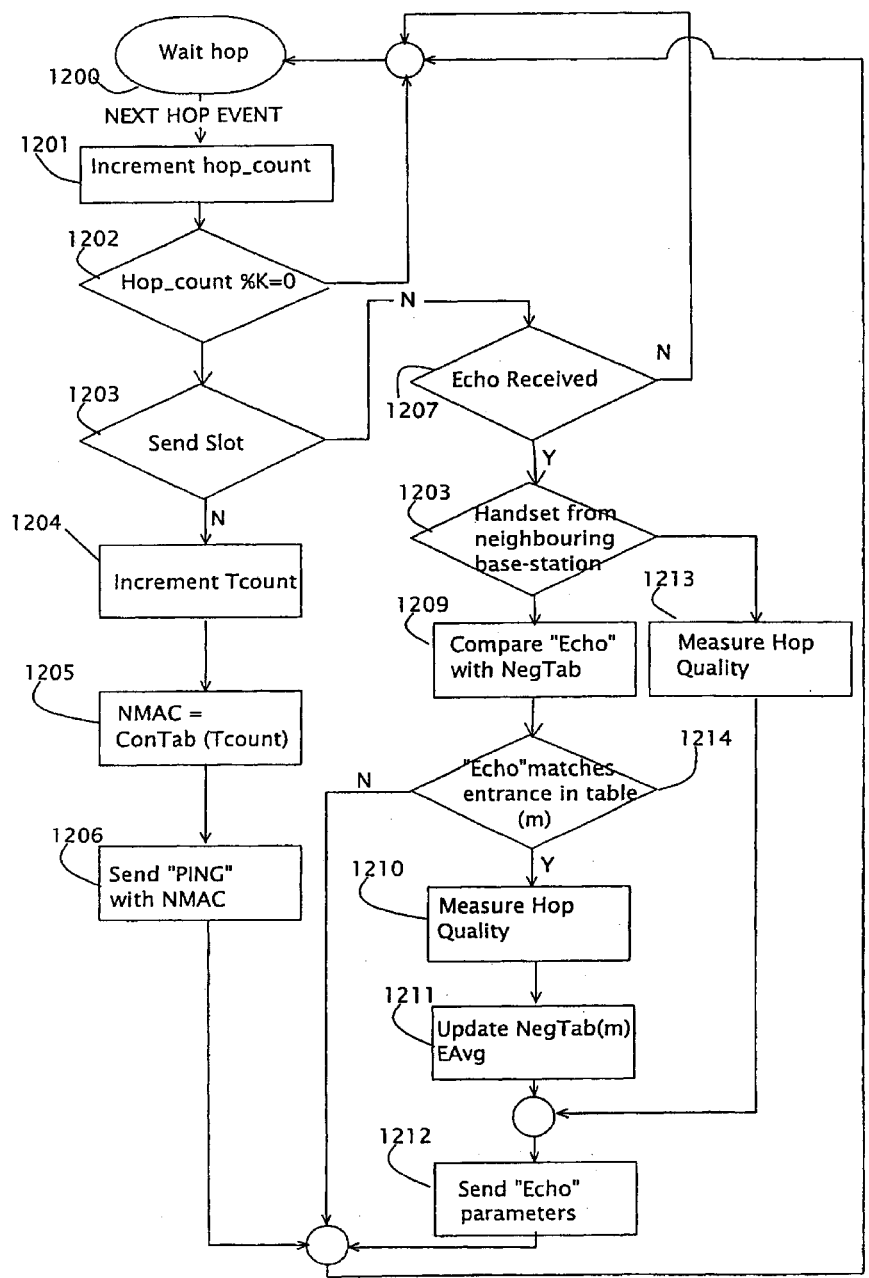
Figure 24:
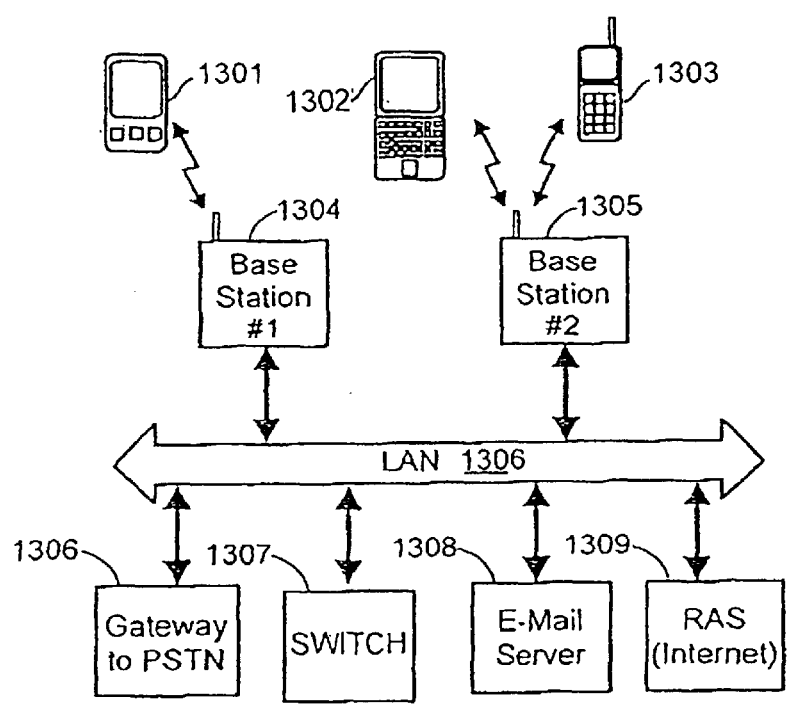

FIG. 23 is a flow chart illustrating a procedure for transmitting "PING" commands to a handset and receiving "ECHO" responses from the handset, when the Base Station originating the "PING" command is the same Base Station the handset is currently connected to, according to the invention; and FIG. 24 is a schematic block diagram of a system utilizing the methods of the current invention to support mobility of personal data devices as well as wireless handsets, according to the invention.

DETAILED DESCRIPTION OF THE INVENTION

FIG. 1 illustrates the basic components and operation of an exemplary, overall communication system 100. A Base Station 101 of a cellular system covers a cell 111 having a relatively large coverage area 111. (The Base Station 101 is shown off-center in its coverage area 111, and the coverage area 111 is shown as elliptical rather than circular, for illustrative clarity.) Base Stations 107, 108 and 109 of a WPBX system cover cells 102, 103 and 104, respectively, each having relatively smaller coverage areas. (The Base Stations 107, 108 and 109 are shown off-center in their respective coverage areas 102, 103 and 104, for illustrative clarity.) Sometimes, these smaller cells 102, 103 and 104 are referred to as "microcells", or "picocells", or "minicells".

A mobile handset 110 can communicate with the cellular Base Station 101 via a communication link 105 and, when it is in the coverage area of the WPBX, it also can use short-range communication link 106, to communicate with one of its Base Stations 107, 108 and 109. In this manner, a standard cellular handset 110, that is enhanced (additionally equipped) with a short-range communication link (e.g. Bluetooth wireless technology) can connect with the WPBX system whenever it is in range of one of the WPBX Base Stations 107, 108 and 109.

The WPBX system can also operate when there is no cellular coverage at all. And the handset 110 can be an ordinary cordless telephone handset. Therefore, the cellular Base Station 101 shown in FIG. 1 is optional, insofar as the WPBX system of the present invention is involved. In the main hereinafter, a handset which is an otherwise ordinary cordless telephone handset, equipped with a short-range communication link (e.g. Bluetooth wireless link) will be used to describe the invention.

In an office environment, a WPBX system improves availability of employees, who carry mobile handsets, and therefore reduces operational cost and increases productivity. In the home environment, a WPBX system enables the use of the standard cellular handsets instead of special cordless phones.

In the present invention, when the handset is the same as the cellular handset, the cost of equipment is lower then the cost of a standard WPBX which requires dedicated handsets. Since the WPBX handles calls between handsets connected to it, the communication charges are lower then when standard cellular communication is used for all the calls.

The handset 110 may indicate to the user that more then one service is available. The user decides which service to use (Cellular or WPBX). The ability to choose between services is a well-known feature in many mobile phones.

It should be understood that the handset 110 is merely an example of a "mobile unit" which can be any of a number of telephony, voice, computing or data devices which communicate via Base Stations, as described in greater detail hereinbelow. As used herein, "Mobile Units" are devices communicating wirelessly with (also referred to as "connected to") Base Stations.

As illustrated in FIG. 1 (and ignoring the cellular Base Station 101 and link 105) the handset 110 is currently communicating with (connected to) the Base Station 108. The Base Stations 107 and 109 are each referred to as "neighboring" Base Stations since they are each adjacent to the Base Station 108 that the handset is currently connected to. The present invention deals largely with how communication with a Mobile Unit such as a handset is handed off (or passed off) from a one Base Station to another (neighboring) Base Station when the handset moves from one minicell to another minicell.

FIG. 2 illustrates the main components and architecture of a WPBX system 200 suitable for use as the WPBX system of FIG. 1. The architecture of a WPBX system generally resembles the architecture of a cellular system. However, as described in greater detail hereinbelow, the function that each component performs is different, since the current invention deals with short-range communication with mobile units that have no built-in support for handoff.

The WPBX 200 comprises a plurality (three shown) of Base Stations 123, 124, 125. A handset 121 communicates via a short-range communication link 122 (e.g. Bluetooth wireless link) with Base Station #1 123. Base Station #2 124 and Base Station #3 125 are ready to receive the call should handset 121 move into their coverage area. At the same time, the other Base Stations may participate in calls with other handsets. For example, Base Station #2 124 communicates via a short-range communication link 134 (e.g. Bluetooth wireless link) with a handset 133. The handsets 121 and 133 may communicate with each other via the WPBX (as opposed to directly with one another), as described in greater detail hereinbelow.

Communication links 126, 127, 128 connect the Base Stations 123, 124, 125 with one another, as illustrated. These communications links transfer data between the Base Stations 123, 124, 125, including voice communication, data communication, connection status information and synchronization information, as described in greater detail hereinbelow, and may be RF links or land lines (e.g., copper wires, optical fibers, etc.).

Communication links 130, 131, 132 connect the Base Stations 123, 124, 125, respectively, with a Central Switch (hereinafter "Switch") 129. These communication links enable the Switch 129 to control the operation of the Base Stations and to participate in the higher levels of the communication protocols, as described in greater detail hereinbelow, and may be RF links or land lines.

FIG. 3A illustrates the addition of a Gateway 135 to the WPBX system 200 of FIG. 2. The Gateway 135 connects the Switch 129 to a Public Switched Telephone Network (PSTN) 136. This enables the WPBX system 200 to receive incoming calls from and to send outgoing calls to other telecommunication systems (not shown) which are connected to the PSTN. The Gateway 135 may be implemented in any suitable manner, such as in hardware and/or software.

As used herein, a "Gateway" is a logical or physical connection between two different communication networks. The term implies a need for conversion of some aspect of the information or communication in order to operate, as contrasted with a "port" which implies a point not requiring significant conversion of the message or information. Gateways are well known.

FIG. 3B illustrates the addition of a Gateway 137 to the WPBX system 200 of FIG. 2. The Gateway 137 connects the Switch 129 to a standard Private Branch Exchange (PBX) 138. This enables the WPBX system 200 to receive incoming calls from and to send outgoing calls to standard telephone sets 139 connected to the PBX 138. As illustrated, the PBX 138 is interfaced with the PSTN 136. Thus, the WPBX system 200 can also communicate with other telecommunication systems (not shown) which are connected to the PSTN.

Having dedicated connections for all the Base Stations 123, 124, 125 and the Switch 129, such as illustrated in FIG. 2, hereinabove, is generally not cost-effective. Rather, when real time interaction or synchronization is not required, a shared local network, for example a local area network such as the IEEE 802.2 Ethernet, can connect these units in a cost-effective manner.

FIG. 4 illustrates a plurality (three shown) of Base Stations 123, 124 and 125 (compare FIG. 2) connected via a communications link which is a Local Area Network (LAN) 140 which handles the transfer of information between the Base Stations 123, 124, and 125, the Switch 129 and, in this example, the Gateway 135 to the PSTN 136. Using a standard local area network (LAN) as the communication backbone allows simple integration with other telephony application servers (not shown), such as IVR (interactive voice response), voice loggers, voice mail and billing systems. The LAN 140 can be either wired, or wireless.

FIGS. 2, 3A, 3B and 4 therefore illustrate, in a general manner, a number of ways in which the main components of a WPBX can be connected with one another, and interfaced with other communications systems (PSTN, PBX, etc.)

For office WPBX applications the Switch 129 may be a standard computer that has the processing power required for handling the switching of hundreds of calls simultaneously. It should support operation in a multi-server environment. This can be achieved with standard server hardware. For home WPBX applications, the Switch 129 may be a part of one Base Station, or a part of several Base Stations.

Call Setup Procedures

FIGS. 5, 6 and 7 illustrate call setup procedures for a single call at an "originating" Base Station (e.g., 123), at a "receiving" Base Station (e.g., 124), and at the Switch (e.g., 129), respectively. Call setup between the handset (e.g., 121) and the Base Station it is connected to (e.g., 123) is suitably performed according to standard telephony protocols, for example ITU-T Q.931. A similar protocol is a part of the Bluetooth protocol stack. However, the present invention is not limited to a specific protocol for call setup.

FIG. 5 illustrates a call setup procedure performed by an originating Base Station (e.g. 123) when a handset (e.g., 121) that is connected to it, tries to initiate a call. As shown in the step 151, the handset that is originating the call sends a destination number (DN). In a next step 152, the originating Base Station (e.g., 123) checks whether the destination handset (e.g., 133) is in its "Base Station Connection Table"—in other words, whether the destination handset is in the originating Base Station's coverage area. If not (step 152, "N"), in a step 160 the destination number (DN) is sent via the communications link (e.g., LAN 140) to the central WPBX Switch (e.g., 129). The originating Base Station then sets a timeout (step 161), and waits for a reply from the Switch. The timeout set in the step 161 is suitably on the order of up to 5 seconds. Next, it is determined in a step 162 whether there is a timeout.

If there is a timeout (step 162, "Y"), the Base Station sends a busy indication (suitably a tone) to the originating handset (step 177), and the Switch is updated about the failure of the call (step 178). If, there is not a timeout (step 162, "N"), the originating Base Station receives (from the Switch) the address of a destination Base Station (step 163). The originating Base Station then calls the destination Base Station (step 164), and it also calls all the neighbors (neighboring Base Stations) of the destination Base Station (step 180). Then the originating Base Station sets a timeout (step 165) and waits for a reply from the called Base Station (and its neighbors). Calling more then one destination Base Station is preferred in order to overcome uncertainties during handoff. The timeout set in the step 165 is suitably on the order of up to 5 seconds. Next, it is determined in a step 166 whether there is a timeout.

If there is a timeout (step 166, "Y"), the Base Station sends a busy tone to the originating handset (step 177), and the Switch is updated about the failure of the call (step 178). If, there is not a timeout (step 166, "N"), and a reply from the destination Base Station is received, the originating Base Station checks if the call is connected (step 167), and then connects the originating handset (step 168), and updates the Switch about the success of the call (step 169).

If, in the step 163 the address of a destination Base Station is not received (N), it is determined (step 170) whether the destination of the call is the Switch itself. If so (step 170, "Y"), a procedure similar to that for sending a call to another Base Station is implemented, except that the call is sent to the Switch (step 171) and not to another Base Station. Then the originating Base Station sets a timeout (step 172) and waits for the Switch to reply (step 173). The timeout is suitably on the order of up to 5 seconds. Next, it is determined in the step 173 whether there is a timeout.

If there is a timeout (step 173, "Y"), the Base Station sends a busy tone to the originating handset (step 177), and the Switch is updated about the failure of the call (step 178). If the Switch responds that the call is connected, there is not a timeout (step 173, "N"), and the originating Base Station connects the handset (step 175), and updates the Switch (step 176) about the status of the call.

If it is determined that the destination handset is in the originating Base Station's coverage area (step 152, "Y"), and a busy signal is not returned (step 153, "N"), the originating Base Station then attempts (step 154) to connect the call to the destination handset, and also to all the neighboring Base Stations (step 181). Again, the calling of neighboring Base Stations is preferred in order to overcome uncertainties, such as the handset moving, during the call setup. Then the originating Base Station performs a procedure similar to that described hereinabove of setting a timeout (step 155), waiting for the Switch to reply (step 156), connecting (step 158) or disconnecting (step 177) the call, and updating the Switch (steps 159 or 178).

In summary, the call setup procedure performed by an originating Base Station (e.g., 123) is that, first, the originating Base Station determines whether a call request from an originating handset (e.g., 121) is:

a. to a DN in the originating Base Station's coverage area (e.g., step 152), in which case the originating Base Station attempts (step 181) to also connect the call to its neighboring Base Stations; or b. to a DN in another Base Station's coverage area (e.g., step 164), in which case the originating Base Station attempts (step 180) to also connect the call to Base Stations which are neighbors of the destination Base Station; or c. to a DN outside of the WPBX coverage area and is to be routed through a Gateway (see FIG. 7) associated with the Switch (steps 170, 171).

In each case, the originating Base Station then:

d. sets a timeout (steps 155, 165, 172);

e. waits for the Switch to reply (steps 156, 166, 173) that the call is connected (steps 157, 167, 174)

f. connects the originating handset (steps 158, 168, 175);

g. updates the Switch (steps 159, 169, 176) about the status of the call; and h. waits (step 179) for a new event (a new call setup).

FIG. 6 illustrates the call setup procedure performed at a destination Base Station (e.g., 124) which is receiving a call, whether it be from another Base Station or from the Switch. When the destination Base Station receives a request (step 201) to connect a call to a handset (e.g., 133) which is reportedly within its coverage area, it first checks (step 202) whether the handset is already communicating with (connected to) it. If the handset is already connected to the Base Station (step 202, "Y"), the Base Station tries to connect the call to the handset. A timeout is set (step 203), again on the order of up to 5 seconds, and the Base Station waits (step 204).

If a time-out occurs (step 204, "Y"), or if a timeout does not occur (step 204, "N") but the call was unable to connect (step 205, "N"), the destination Base Station returns an indication (step 208) of call setup failure ("unable to connect") to the originating Base Station (or to the Switch, as the case may be). If, however, the connection succeeds (step 205, "Y") the Base Station returns an indication (step 206) of successful call setup ("call connected") to the originating Base Station. In either case (call connected, unable to connect), the destination Base Station sends similar indications (steps 211, 212, respectively) to all the neighboring Base Stations of the originating Base Station Again, sending the reply to the neighboring Base Stations is to overcome uncertainties during handoff. In both cases the Switch is updated at steps 207 and 209, respectively. Finally the Base Station waits (step 210) for a new event (a new call setup).

FIG. 7 illustrates the call setup procedure performed at the Switch (e.g., 129). The Switch handles two types of messages, one is a request to establish a new call, and the other is an update to the status of the call. In a step 231, it is determined whether the request is for a new call (step 231, "Y") or a request to update a call (step 231, "N").

If the arriving message is a request to update a call (step 231, "N"), an update of the "Calls Table" is generally required (step 254, "Y"). The Switch checks if it receives indication that the call is connected (step 255). If the call is connected, (step 255, "Y"), the status of the call is updated in the Calls Table (step 256). Otherwise (step 255, "N"), the call is removed from the Calls Table (step 257).

If the arriving message is a request to initiate a new call (step 231, "Y"), the Switch checks if the call is intended to a handset connected to the WPBX (step 232). This is done by checking its "Connections Table". If the call is intended to connect to outside the WPBX (e.g., via the PSTN 136), the Switch checks (step 233) if the destination number (DN) is a legal (valid) number. If the DN is a valid number (step 233, "Y"), in a step 234 the Switch transfers the call to the Gateway (e.g., 135), sets a timeout (step 235) and waits (step 236). If not (step 233, "N"), the program exits.

If the connection via the Gateway succeeds (step 236, "N"), it is whether the call is connected determined (step 237). If the call is connected, (step 237, "Y"), the Switch requests from the originating Base Station to transfer the call to the Switch(step 238), and waits for connection with originating Base Station (steps 239, 240). If connection succeeds, and the call is connected (step 242, "Y"), the call is added to the "Calls Table" (step 243), and the call is routed to the Gateway (step 244). If connection fails (step 240, "Y"; or step 242, "N"), the connection with the Gateway is disconnected (step 241).

If the call destination is one of the Base Stations (step 259), its source may be another Base Station (step 249), or the Gateway (step 245). If the source is another Base Station, the Switch send to the originating Base Station the address of the destination Base Station, and adds the call to the "Calls Table". If the call arrived from the Gateway the Switch tries to connect the call to the destination Base Station (step 245). If is succeeds the call is added to the "Calls Table" (step 252), the call is transferred to the destination (step 253). If it fails the connection with the Gateway is disconnected.

The procedure described in FIG. 7 is also applicable to the case when more than one Gateway connects to the WPBX to the PSTN—for example, in a case where two branch offices share a single WPBX, and each has its own independent connection to the PSTN. The main difference would be that when the Switch handles an outgoing call, it will determine to which Gateway to send the call. This can either be done randomly, or can be pre-determined. The handling of the incoming calls would proceed as set forth above in FIG. 7.

FIGS. 5, 6 and 7 have illustrated a call setup procedure for the handling of a single call. When either the Base Stations or the Switch need to handle more then one call, several instances of these procedures can be run in parallel. For that purpose, both Base Station software and Switch software are preferably based on a real time operating system that supports multi-tasking. For each new call, a new task will be created, and the task will perform the procedures described in FIGS. 5, 6 and 7. The task will be closed when the procedure is completed.

In systems with a very large number of Base Stations, due to limited processing power of each Switch, it may be preferable to divide the Switch into two or more units. Dividing the Switch into several units can also improve the reliability of the WPBX, by eliminating the possibility of having a single point of failure shutting down the entire system.

FIG. 22 illustrates the division of the Base Stations, into two groups; a first group (Group A) 1050 comprising a plurality (four shown) of Base Stations 1050*a*, 1050*b*, 1050*c* and 1050*d*; and a second group (Group B) 1051 comprising a plurality (four shown) of Base Stations 1051*a*, 1051*b*, 1051*c*, 1051*d*. The Base Stations of Group A are connected to a first Switch (Switch A) 1052, and the Base Stations of Group B are connected to a second Switch (Switch B) 1053. The Base Stations and the Switches function according to the procedures described in FIGS. 5, 6 and 7. All the Switches mirror all the status tables of the other Switches, i.e. by having copies of each other's "Calls Table" and "Connections Table". When a Switch updates one of its status tables, it sends the information to all the other Switches, and they update their tables accordingly. In order for this process to be reliable, the other Switches will send an indication that the message was received. If the originating Switch does not receive such a reply within $T_1$ milliseconds, it will retransmit the message. The retransmission will be repeated up to P times. For example $T_1$ shall be equal to 100, and P shall be equal to 5.

It is within the scope of the invention that more than two Switches, and corresponding more than two groups of Base Stations can be employed. As described hereinabove, all of the Switches would mirror and update each other's status tables. The description of two Switches 1052 and 1053 is intended to be exemplary rather than limiting.

Calls Table

The Switch (129) maintains the "Calls Table", which contains the status and information about all the active calls being handled by the WPBX. The "Calls Table" comprises the following information:

1) Each active call has a unique "Call Identification number".
2) The origin of the call, which can be either "Internal" or "External".
3) The destination of the call, which can be either "Internal" or "External".
4) "Calling Number Identification (CNID)", the number of the calling party, if available.
5) Destination Number (DN), the number of the answering party if available.
6) "Originating Base Station Identification" for calls from internal origin
7) "Destination Base Station Identification" for calls with internal destination,
8) Status of call—initiated, connected, disconnected.
9) Additional information for billing, performance analysis, such as call starts time, number of handoffs, time since last handoff, etc.

The "Originating Base Station Identification" and the "Destination Base Station Identification" are updated when a handset moves from one Base Station to another. The Switch updates these fields when it determines that the handoff should occur. During handoff, for a short time, there may be uncertainty about the validity of these fields. The Base Stations compensate for the uncertainty by "multicasting" the call setup messages to a group of Base Stations, as described hereinabove with respect to FIGS. 5 and 6 (see, e.g., steps 180, 181, 211, 212).

The procedures described above do not limit the WPBX from handling all unique telephony features that the Gateway and the handsets can support. For example, multiple connections can be created between handsets, and between handsets and the Gateway, when each connection is treated as a separate call. Another example is "Caller ID", that the Gateway can send to a handset. Another example is a "Hook-Flash" (momentary disconnect) that the handset can pass to the Gateway. The WPBX acts as a transparent relay for all these telephony features.

High-Level and Low-Level Protocols

In the descriptions set forth hereinabove, it has generally been assumed that:

1. Each Base Station knows which handsets are in its coverage range.

2. The Switch is aware of the connections of all the Base Stations.

3. Connections appear static to users and also to the high-level call setup procedures described above.

A method to achieve mobility, which fulfills these three assumptions is described in detail, hereinbelow.

According to the invention, the short-range communication protocol stack is divided into two parts:

low-level protocols performing real time tasks, and high-level protocols that do not have real time requirements.

For example in the Bluetooth short-range communication protocol stack, the low-level protocols are the radio frequency (RF) transmitter and the base-band controller. The base-band controller performs real time control over the RF, since the Bluetooth protocol utilizes frequency-hopping transmission. The base-band protocol also determines, for each time slot of transmission (i.e. each frequency hop), what information will be transmitted. The base-band protocol also deals with voice coding, error correction, encryption and authentication. For example, higher level protocols of the Bluetooth stack include the "Link Manager" which determines what information will go through the channels created by the "Base-Band", and determines the state of operation (e.g. Active, Polling, Parked).

The low-level protocols that require real time capabilities are performed in the Base Station. The higher-level protocols are performed at the Switch. (However, as described hereinbelow, certain high-level protocols can also be performed in the Base Station, even though they do not require real time capabilities.) The Switch handles the routing of data from the higher-level protocols to the lower level protocols. (A call routing task (282) is described in greater detail hereinbelow.) Therefore, the higher-level protocols do not need to "know" in which Base Station the lower level protocol that they are controlling is being performed.

FIGS. 8A and 8B illustrate an example of a WPBX system 800 with two handsets 121 and 133, two Base Stations 123 and 124, and one Switch 129. In this example, two calls are being handled. Gateways (e.g., 135, 137) are omitted, for illustrative clarity. As mentioned hereinabove (see, e.g., FIG. 22), the Switch can be divided into several units As illustrated in FIG. 8A, the handset 121 is currently communicating with (connected to) the Base Station 123, and the handset 133 is currently communicating with the Base Station 124. An instance 280 of the low-level protocol is running on the Base Station 123, and another instance 281 of the low-level protocol is running on the Base Station 124. Each instance of the low-level protocol supports only one call. In a similar manner, the Switch 129 handles an instance 283 of the high-level protocol for the call with the with the handset 121, and another instance 284 of the high-level protocol for the call with the handset 133. A single call routing task 282 handles the data that is transferred between the instances of the low-level protocols and the high-level protocols to the correct destination.

As illustrated in FIG. 8A, the call routing task 282 routes data arriving from instance 280 of the low-level protocol to instance 283 of the high-level protocol, and from the instance 281 of the low-level protocol to the instance 284 of the high-level protocol. Since interaction between the high-level-protocol and low-level protocol, is normally relatively rare (e.g. call setup), there are no strict real time requirements from the call routing task. The call routing task 282 is described in greater detail hereinbelow, with respect to FIG. 12.

As illustrated in FIG. 8B, the handset 133 is shown as having moved to the area covered by the Base Station 123. The Base Station 123 will handle the communication with the handset 133, by creating a copy 281' of the instance 281 of the low-level protocol, that previously ran on Base Station 124. This allows the handset 133 to continue communication without "knowing" that a changeover of Base Stations has occurred. The call routing task 282 will now route the data arriving from the instance 281' of the low-level protocol running on Base Station 123 to the instance 284 of the high-level protocol 284 which is running on the Switch 129.

For each connection of a Base Station with a handset, there is a separate instance of the low-level protocol running at a Base Station connected to the handset, and a corresponding separate instance of the high-level protocol running at the Switch. These instances are created, on an as-needed basis, when a connection is initiated. Preferably, a real time multi-tasking operating system is used in order to allow handling of many instances of the protocols simultaneously in the Base Stations and in the Switch. The procedures that the Switch uses during initiation of a connection and later, during handoff, are discussed in greater detail hereinbelow.

Synchronization of Base Stations During a Handoff

There follows a description of procedures that are performed during handoff of a call from one Base Station to another Base Station. The Base Station with which a handset is currently connected is termed the "current" Base Station. The Base Station to which a handset is being handed off is termed the "next" Base Station, and is typically a "neighboring" Base Station. Once the handoff has occurred, this neighboring/next Base Station becomes the "current" Base Station and the Base Station from which the handset has moved becomes the "previous" Base Station.

According to an aspect of the invention, the handsets do not need to be (and preferably are not) specially equipped or enabled to support mobility (i.e. handoff). Therefore, when a handset moves from one Base Station to another, the current and the next Base Stations are responsible for continuing the communication with the handset, preferably with no noticeable interruption in the communication, and the next Base Station to which the handset has moved should transmit substantially exactly as the previous Base Station from which the handset has moved would have transmitted. For purposes of the discussion of this example, it is assumed that it is known from which Base Station the handset has moved and to which Base Station the handset is moving, and that the exact timing of handoff is also known. These issues are discussed in greater detail hereinbelow.

FIGS. 9A, 9B and 9C illustrate, in a general manner, a handoff taking place between two Base Stations 123, 124 and a single handset 121 of a WPBX.

FIG. 9A illustrates the handset 121 communicating with (connected to) a Base Station (Base Station #1) 123 via a short-range communication link 122 (e.g. Bluetooth wireless link). The "current" Base Station 123 sends call parameters and rough synchronization information over the LAN 140 to the neighboring Base Stations, a one of which is shown as Base Station #2 124. In this manner, the neighboring Base Stations "know" that they are "candidate" Base Stations for receiving a handoff of the call from the current Base Station. The information which is broadcast by the current Base Station to the candidate next Base Stations includes low-level communications protocol states and parameters, discussed in greater detail hereinbelow. This communication from the Base Station 123 to the Base Stations 124 is indicated by the arrow 141, and the information contained therein is used to achieve rough (coarse) synchronization between the Base Stations. Since this information does not need to be accurate in time, it can be transmitted over the data link (e.g., LAN 140) connecting all of the Base Stations.

FIG. 9B illustrates a handoff as it is about to take place. Here, the handset 121 is situated in an area covered by both Base Stations 123 and 124. Base Station 124 uses this situation to achieve exact (fine) synchronization with the current Base Station 123. This will enable the next Base Station 124 to transmit, after the handoff, substantially exactly as previous Base Station 123 would have transmitted if the handoff had not occurred. A method for effecting this fine synchronization between neighboring Base Stations is discussed in greater detail hereinbelow.

An important parameter of synchronization is Time Of Day (TOD), which can be determined with virtually any desired level of precision (e.g., microseconds). As described in greater detail hereinbelow, in order to achieve fine synchronization of TOD, the Base Station 124 that is waiting for the handset 121 may passively monitor the transmissions of either the handset 121, or of the Base Station 123 that is currently connected with the handset. In FIG. 9B, the two possible fine synchronization signals that the candidate next Base Station #2 124 can monitor are shown, a signal 142 originating from the Base Station #1 123, and another signal 143 originating from the handset 121.

FIG. 9C illustrates that synchronization of the Base Stations 123 and 124 may alternatively be achieved by use of a beacon signal from a beacon transmitter 299 which is within range of current and next Base Stations, in which case precise (fine) synchronization for the low-level protocols can also be achieved. The beacon transmitter 299 transmits a beacon signal 144 to both of the Base Stations 123 and 124 to achieve synchronization of the Base Stations. This method allows for the synchronization of many Base Stations, although only two are illustrated in this figure. In this case, there is no need to transmit synchronization information over the LAN 140. Only call parameters (e.g., low-level protocol) need to be communicated between the current Base Station and the neighboring candidate next Base Stations, as indicated by the arrow 141".

Bluetooth Short-Range Wireless Communication Protocol

As discussed hereinabove, a short-range communication protocol with the handset can be divided into lower-level protocols which the Base Stations handle, since they have real time requirements, and higher-level protocols which the Switch handles since they do not require real time requirements. Bluetooth wireless technology is an example of such a short-range communication protocol. In Table 1, a division of the Bluetooth short range wireless protocol into such low-level and high-level protocols is presented.

TABLE 1

| Communication Protocols | | | |
| --- | --- | --- | --- |
| Element (Protocol Name) | Description of Protocol (Bluetooth Protocol) | Real time requirements | Level/ Where |
| Radio Frequency (RF) | Defines the modulation scheme and the frequency range | Control of radio frequency in real time required, modulates each symbol | Low/ Base Station |
| Base-band | Frequency control, channel definition, transmission/ reception control, encryption, error correction, authentication. | Control frequency hopping in real time. Determines what packet will be sent at each hop. Encryption/Error correction for each hop. Accurate time synchronization | Low/ Base Station |
| Link Manager | Link setup and control | None | Low or High Base station or Switch |
| Host Controller Interface | Communication between protocol stack and lower level implementation | None | Low or High Base station or Switch |
| Logical link manager | High level protocol multiplexing, packet segmentation and Reassembly, quality of service management | None | High/ Switch |
| Service discovery | Locating a service available by a Bluetooth device | None | High/ Switch |
| RF COMM | A subset of the ETSI TS 07.10 standard, emulation of serial port over the Logical link manager | None | High/ Switch |
| Ird Interoperability | Interoperability for applications over Bluetooth and infra-red protocols | None | High/ Switch |

TABLE 1-continued

Communication Protocols

| Element (Protocol Name) | Description of Protocol (Bluetooth Protocol) | Real time requirements | Level/ Where |
|---|---|---|---|
| Telephony control protocol | Call control signaling and establishment of speech and data calls between Bluetooth devices. | none | High/ Switch |
| Interoperability requirements for Bluetooth technology as WAP bearer | Bluetooth protocol with PPP as communication bearer for WAP | none | High/ Switch |
| Host control Interface | Command interface to the base-band controller and link manager, and access to status information | none | High/ Switch |
| Generic Access Protocol | Generic procedures for Discovery of services and connection of Bluetooth devices | none | High/ Switch |
| Service discovery application profile | Procedures for an application in a Bluetooth device to discover the services in other Bluetooth devices | none | High/ Switch |
| Cordless Telephony Profile | Procedures in an all in one handset | none | High/ Switch |
| Intercom Profile | Support for intercom feature in an all in one handset | none | High/ Switch |
| Serial Port Profile | Procedure for emulation of serial cable | none | High/ Switch |
| Headset Profile | Headset use over Bluetooth wireless link | none | High/ Switch |
| Dial up Networking Profile | Support for dial up networking in a device with Bluetooth wireless technology | none | High/ Switch |
| FAX Profile | Support for fax transmission or reception on a device with Bluetooth wireless technology | none | High/ Switch |
| LAN Access Profile | Defines how device with Bluetooth wireless technology can access a LAN with PPP | none | High/ Switch |
| Generic Object Exchange Profile | Defines the possibility of Generic Object Exchange | none | High/ Switch |
| Object Push Profile | Support for object push model | none | High/ Switch |
| File Transfer Profile | Support for file transfer | none | High/ Switch |
| Synchronization Profile | Synchronization of Bluetooth enabled device, e.g. PDAs Laptops | none | High/ Switch |

Table 1 shows the elements of the Bluetooth protocol, generally, as currently implemented. Other profiles may be added in the future (or may have already been added), and it is anticipated that these profiles will be high-level protocols, which do not have strict real time requirements.

As shown in Table 1, the Link Manager and the Host Controller Interface can be implemented in either the Base Station or in the Switch. Although the Link Manager and Host Controller Interface, do not require real time performance, they may readily be implemented in the baseband controller of the Base-Station. It is within the scope of the invention that any of the high-level protocols can also be implemented in the Base Station as part of the low-level protocol, but then they will take part in the handoff.

According to the inventive technique of dividing the low-level and high-level protocols, the high-level protocols are "buffered" from the occurrence of handoff by the Base Stations and the routing task that runs on the Switch. Therefore, the present invention allows mobility of any device with Bluetooth wireless technology that supports any of the high-level protocols (e.g. LAN access, WAP, FAX, FTP). The solution for mobility of cordless phones, described hereinabove, is only an example of how the methods can be utilized.

As described hereinabove with respect to FIGS. 8A and 8B, different instances of the low-level protocols that represent the same connection (e.g., 281, 281') need to be synchronized. Table 2, presents elements (parameters) of the low-level protocols that the Base Stations will synchronize. For each element, it also shows whether rough or fine synchronization is required. Again, the protocols are described, by way of example, in the context of the Bluetooth short-range communication protocol.

Rough synchronization may be achieved via the local area network (see, e.g., LAN 140, FIGS. 9A and 9B) connecting the Base Stations. Fine synchronization may be achieved by other methods described in greater detail hereinbelow.

TABLE 2

Low-Level Protocol Synchronization

| Element/Parameter | Description | Synchronization method |
|---|---|---|
| device address | The unique address of the Base Station, determines the hopping sequence, effects the encryption and authentication keys. | Via LAN |
| TOD | Time Of Day, measured in micro-seconds, it determines the exact timing of the hopping sequence | Rough synchronization via LAN, fine synchronization by other methods |
| SCO | Synchronous voice channels allocation | Via LAN |
| FEC | Forward error correction parameters | Via LAN |
| Encryption key | Use to encrypt data and voice | Via LAN |
| Authentication key | Used to initiate a connection | Via LAN |
| Voice coding | Method of voice coding: CVSD or PCM | Via LAN |
| AM_ADDR | Address of member in a picocell | Via LAN |
| PM_ADDR | Address of a parked handset (energy saving mode, when the handset is inactive) | Via LAN |
| ACL | Definition of the asynchronous data link | Via LAN |
| FIFO | Data FIFOs | Flush of data, and using flow control to halt data during handoff |

All the parameters listed in Table 2, except for the TOD, can be sent prior to handoff, thorough the local area network (e.g., LAN 140), or any other communication link connecting the Base Stations. As described hereinabove with respect to FIG. 9A, rough (coarse) TOD can also be sent through the LAN.

If one of the other parts of the Bluetooth protocol stack is also implemented in the Base Station, then it will also take part in the handoff. Synchronizing the instances of the same protocols in different Base Stations is done as described above, by sending internal state parameters via the local area network (LAN 140). For example, by implementing the Link Manager and Host Controller Interface in the Base Station, the internal state parameters of these protocols will be broadcast to the neighboring Base Stations, by the Base Station that is connected to the handset.

Fine Synchronization

As mentioned hereinabove, in order to achieve fine synchronization of TOD, the Base Station that is waiting for the handset, should passively monitor the transmission of the handset and/or the Base Station that is currently connected with the handset. In FIG. 9B, the two possible signals that the receiving (next) Base Station 124 can monitor are shown, one originating from Base Station 123, and the other originating from the handset 121 which is currently connected to the Base Station 123.

According to the invention, the next Base Station 124 can be finely synchronized by receiving synchronization signals from the current Base Station 123. Normally, the Base Station 124 does not receive signals from the Base Station 123. Therefore, to facilitate the Base Station 124 receiving synchronization signals from the Base Station 123, Base Station 123 periodically transmits with higher transmission power than during normal transmission. This allows the Base Station 124 to receive transmissions from Base Station 123, without a substantial increase in spectral contamination. The inventive technique is described in the context of frequency-hopping. Frequency-hopping techniques are well known, including techniques that change frequency with each hop.

FIG. 10 illustrates a technique for controlling the transmission power of a Base Station (e.g., 123) that is currently connected with the handset, for a plurality (series) of successive hops 290. The vertical axis of the graph is the Base Station's transmission power (in arbitrary units), and the horizontal axis is time. $T_h$, the duration of a hop 290. In this example, the hops 290 all have equal duration. Tp is the time interval between successive hops (or "hop time slot") and, in this example, the intervals between successive hops are constant (evenly spaced in time). The normal transmission power for each hop 290 is $P_0$. For example, in a short-range communication system, the normal transmission power $P_0$ of a Base Station is suitably on the order of a hundreds of milliwatts.

According to the invention, in order to effect synchronization between a Base Station and its neighboring Base Stations, every Kth hop 290' is a "synchronization" hop that is transmitted with increased power $P_1$. $P_1$ is suitably substantially (e.g., 2–10 times) greater than $P_0$. In the case that the transmitter changes the transmission frequency in each hop, every Kth (synchronization) hop will also be transmitted at a different frequency.

Alternatively, it is within the scope of the invention that a variable time interval (Tp) is provided between the synchronization hops 290' that are transmitted with high power $P_1$. For example a changing K (that shall be denoted by K(n), i.e. K for hop number 'n'), can be generated by a pseudo random sequence such as a maximal length shift register sequence. Pseudo random sequences are well known for use in communication systems.

In the case that a beacon transmitter (e.g., 299) is used (in addition to signals received from the Base Station and handset) to synchronize the Base Stations (see, e.g., FIG. 9C), it can suitably transmit the beacon signal once in K hops, and K can either be constant or it can be changed over time (variable), as described above.

Low-Level Synchronization at the Base Station

FIG. 11 illustrates major components of a Base Station 1100 waiting for handoff, and a method of accurately synchronizing the TOD at the Base Station to the TOD of the Base Station which the handset is about to leave, including:
Time Clock 310;
TOD counter 303;
Antenna 301;
Receiver 305;
Frequency Hopping Generator 304;
Emulator 307;
Correlation Detector 308; and
Adder (ADD) 309;
all connected as illustrated in the figure and as discussed hereinbelow.

As described hereinabove with respect to FIG. 9A, a rough TOD from the Base Station currently connected with the handset is available to the (next) Base Station waiting for a handoff on a communication link such as the LAN 140. This rough TOD is provided to the TOD counter 303 (e.g., via an interface to the LAN 140). A Time Clock 310 generates clock signals for incrementing the TOD counter 303. The output of the TOD counter 303 is therefore a rough estimate of the TOD ("TOD Estimate"). There is an uncertainty (margin of error) "Tu" between the rough estimate of TOD and the actual TOD, and which depends on the transmission latencies thorough the LAN 140. "Tu" is readily calculated for a given WPBX system, according to its physical configuration.

From the rough estimate of the TOD output by the TOD counter and the device address ("Commonly denoted by Media Access Control Address, or MAC address"), a frequency-hopping list is generated by a frequency-hopping generator 304 and supplied to an emulator 307 which emulates the output of the receiver 305. In a window with size of $2 \cdot T_u$, a single frequency from the hopping sequence is chosen, and the receiver 305 will wait on this frequency for duration of $2 \cdot T_u$. Once in a period of $2 \cdot T_u$, the receiver 305 will switch frequency, in response to a signal generated by the frequency-hopping generator 304. Opening an acquisition window of $2 \cdot T_u$ ensures that during this time duration the receiver 305 will capture at least one hop. A correlator/detector 308 receives the receiver's output (e.g. a base-band or intermediate frequency signal) and an emulation 307 of the signal that should appear at the receiver's output. The output of the receiver 305 can be emulated, since a rough estimate of the TOD is available, and also from the hopping frequency list, and the receiver frequency list. The emulator 307 continuously checks for a match between receiver frequency and the hopping frequency and, when it finds a match, it reports the frequency and the time (rough TOD) to the correlator/detector 308. By comparing the actual received signal with the emulation that is based on the rough TOD, the correlator 308 computes (and outputs) a fine estimate of the TOD offset (i.e., the error between the TOD estimate and the actual TOD), and provides this to Adder 309, which also receives the rough TOD estimate from the TOD counter 303 and generates a signal ("Fine TOD") indicative of the actual TOD. Correlator-based time offset measurement is a standard estimation method that is described in many textbooks, and an example of its implementation is described in greater detail hereinbelow.

Since the Base Station to which the call is to be handed "knows" which call it is going to receive, and it has received the call parameter (via the LAN), and is able to accurately estimate the TOD, it will be able to perform a seamless handoff, transmitting substantially exactly as the Base Station that the handset is about to leave. As mentioned above, an iteration of the low-level protocol (e.g., 281') can be prepared at the receiving Base Station in anticipation of the handoff.

Call Routing Task (282)

The higher-level protocols are run at the Switch, and are therefore "ignorant" of the handoff processes. At the Switch the "call routing task" 282 (FIGS. 8A, 8B) isolates the high-level protocols from the changing environment. The "call routing task" 282 maintains the "Connections Table", which contains information about all the connections between handsets and Base Stations. Maintaining the Connections Table is described in greater detail hereinbelow. The following sections describe an example of how the Connections Table is used by the "call routing task" 282.

The following information is included in the Connections Table:
1) Handset ID
2) Current Base Station ID
3) Handle (of instance) of high-level protocols
4) Handle (of instance) of low-level protocols
5) Number of candidate Base Stations for handoff
6) List of candidate Base Stations for handoff
7) List of Handoff status for each candidate Base Station (i.e., Idle/Started)

The messages that the high-level protocol (that runs on the Switch) and the low-level protocol (that runs on the Base Station), send each other have the following format:
1) Message Header
   Origin:
   from low-level protocol
   from high-level protocol
   Handset ID
   Base Station ID
   Low-Level Protocol Handle in the Base Station (number of instance of low-level protocol)
   High-Level Protocol Handle in the Switch, (number of instance of high-level protocol)
   HEC (header error correction)
2) Message Data
3) CRC (Cyclic Redundancy Check)

FIG. 12 illustrates a method of implementing the "call routing task" 282 which was mentioned hereinabove with respect to FIG. 9A. The "call routing task" 282 is performed in the Switch 129.

In a first step 351, the call routing task 282 waits for a message from one of the high-level protocol instances running on the Switch 129 or from one of the low-level protocol instances running on the Base Stations (e.g., 123). Then, in a step 352, it is determined where the call came from.

If the message arrived from one of the Base Stations (step 352, "Y"), the call parameters are compared with the Connections Table (step 353) and the message is sent (step 354) to the instance of the high-level protocol running on the Switch (129).

If the message arrived from the Switch (step 352, "N") the ID of the sending low-level protocol instance is located (step 353) in the "Connections Table", and the message is sent (step 354) to an instance of a corresponding high-level protocol. If the message arrived from one of the high-level protocols (step 352, "N"), it is determined (step 360) whether a handoff has begun (is in progress). If a handoff is not in progress (step 360, "N"), the call parameters are compared with the Connections Table (step 358) and the message is sent to the Base Station on which the destination low-level protocol instance is running (step 359). If a handoff is in progress (step 360, "Y") the call parameters are compared with the Connections Table (step 355) and the message is sent to the Base Station on which the destination low-level protocol instance is running (step 356). The message is also sent (step 357) to all the Base Stations that are candidates for handoff—e.g., neighboring Base Stations. The Base Stations receiving the message can then check if they are running the destination low-level protocol and, if not, the message is simply discarded. The procedure shown in FIG. 12 handles a single message. By using a multitasking operating system, it is possible to run several instances of these procedures, and thus handle more than one message simultaneously.

Detecting a Handset

The methods described thus far enable the communication protocols to continue operation when a handoff occurs. They rely on the ability to determine, which handset is in the coverage area of which Base Station, where a handset is moving, and when is the best time to perform handoff. By definition, handoff occurs between only two Base Stations, but for a certain time prior to the actual occurrence of the handoff there may be more than one Base Station that are candidates for handoff. Determining the candidates for handoff, which Base Station will actually participate in handoff and when to perform handoff requires collaboration of the Base Stations and the Switch.

As is evident from the discussions hereinabove, the handsets do not actively participate in the handoff operations. Therefore, the Base Stations will determine which handsets are in their coverage range, by either passively capturing transmission information, or by "tricking" the handset to transmit information that can be used for that purpose.

As discussed hereinabove, each Base Station will transmit, to all the neighboring Base Stations, information about the calls that are taking place in its coverage area. This information will include all the call parameters that can be sent through a low bandwidth communication link, such as the shared local area network (e.g., LAN 140). This information is sufficient for detecting which handset is moving from one of the neighboring Base Stations into the coverage area of a Base Station.

FIG. 13 illustrates major components of a Base Station 1300, waiting for handoff, and a method of accurately synchronizing the TOD at the Base Station to the TOD of the Base Station, which the handset is about to leave, and a passive method for detecting the arrival of a handset in a Base Station's coverage area during a call, including:

Three TOD counters 371, 380 and 384 (compare 303)

Antenna 382 (compare 301);

Receiver 379 (compare 305);

A Receiver Frequency Controller 375;

Three Hopping Sequence Generators 372, 373 and 374;

Three Emulators 376, 377 and 378;

Three Correlators 381, 382 and 383 (compare 308),
all connected as illustrated in the figure and as discussed hereinbelow.

FIG. 13 illustrates a passive method for determining which handsets' (i.e. handset which is participating in a call with a certain device address) transmissions is being received by a Base Station.

A plurality ("K", three shown) of TOD counters 371, 380 and 384 are set when a rough TOD ("Rough TOD") estimate is received, via the LAN (140), from other Base Stations. The counters 371, 380 and 384 are incremented by the TOD clock 310. Using the TOD and the device addresses ("Bluetooth Device Address") that are connected to calls in which handsets in the neighboring cells (connected to neighboring Base Stations) participates, a corresponding plurality ("K", three shown) of hopping frequency (sequence) generators 372, 373, 374 generate the list of frequencies in which the handsets are likely to transmit.

The receiver frequency controller 375 sets the frequency, which the receiver 379 will monitor. A plurality ("K", three shown) of correlators 381, 382 and 383 is used to compare the energy at the receiver's output, to the emulation of the receiver's output. The output of the receiver can be emulated, since a rough estimate of the TOD is available, as well as the hopping frequency list, and the receiver frequency list. The emulator continuously checks for a match between receiver frequency and the hopping frequency, when it finds the match it reports to the correlator the frequency and the time. By comparing the actual received signal with the emulation that is based on the rough TOD, the correlator detect the presence of the transmitter and computes a fine estimate of the TOD offset (i.e., the error between the rough TOD estimate and the actual TOD). Correlator-based time offset measurement is a standard estimation method that is described in many textbooks, example of implementation shall be described later on. The number of handsets that can be detected simultaneously is equal to the number of hopping sequence generators, and the number of emulators of receiver output, and the number of correlators.

In FIG. 13 up to 'K' handsets can simultaneously be detected. The main advantage of the method described above is that since the detection is passive, there is no need to achieve fine synchronization between Base Stations. Another advantage of this passive method is that there is no need to decode the messages that the handset transmits, and therefore it is relatively easy to implement.

The receiver frequency controller 375 selects the frequency on which the receiver 379 will wait to "capture" hops. To increase the probability of detection, the receiver frequency controller 375 should be programmed to choose frequencies that are not blocked by interferences (e.g., interferences from other than Bluetooth transmitters). For each frequency that the receiver frequency controller 375 chooses, a histogram of the number of hops that have been detected in a certain duration of time, and their average signal-to-noise ratios are maintained by the receiver frequency controller 375. A measure of the spectral "cleanness" of a certain frequency can be determined as a function of the signal-to-noise ratios (SNRs) of the hops—for example, as the number of hops multiplied by the average signal-to-noise ratios (SNRs) of the hops.

The receiver frequency controller 375 preferably chooses a group of 'M' frequencies that have the best "cleanness" measure, and the receiver 379 waits on them most of the time, when once in T1 milliseconds the controller changes the frequency. Once in T2 milliseconds (T2 is selected to be much larger then T1) the receiver frequency controller 375 selects a frequency which is not in the group of 'M' best, and the receiver 379 waits on it for T3 milliseconds (T3 is selected to be smaller then T1). This enables the receiver frequency controller 375 to monitor the "cleanness" of frequencies that are not in the 'M' best frequencies. If the receiver frequency controller 375 detects a frequency that is cleaner then one of the 'M' frequencies that is in its list, it puts it in the list, instead of the frequency with the lowest "cleanness" measure. Typical values for the parameters M, T1, T2, T3 are 20, 250, 2500, 100, respectively.

Generally, the signal-to-noise ratio (SNR) or signal-to-interference ratio for each hop is measured by measuring the bursts of energy which match the expected hop duration, to all other signals that do not match the hop duration. The average noise level is continuously monitored. When the energy increases for duration ranging from Th−D to Th+D (Th is the nominal hop duration; D is a measurement "window" interval), the hop energy will be computed, and it will be added to the average hop energy. During the duration of the hop the average noise level is not be updated. Typical values for Th and D, are 0.65 milliseconds, and 1000 milliseconds respectively.

Another Method of Detecting a Handset

An alternative method for detecting a handset which enters the coverage area of a Base Station, is now described. This method is also passive, and also relies on a handset being engaged in a call in order to detect the handset. This method requires fine synchronization between the Base Stations and therefore is somewhat more complicated than the passive method previously described, but using this method has a few substantial advantages over the method previously described, including:

improved detection performance, improved timing of handoff, and the ability to detect a moving handset that is not currently participating in a call.

According to the invention, once in a while the Base Station that is currently communicating with the handset will "give up" (omit, yield to its neighbors) a short transmission duration, during which one or more neighboring Base Stations may transmit to the handset. In order for the handset to receive their transmission, the neighboring Base Station(s) must therefore be synchronized with the Base Station that is currently communicating with the handset, and during the time that the neighboring Base Station(s) transmits, it (they) acts as if it were the Base Station that has yielded a transmission slot for handset detection by the neighboring Base Stations.

This method can be illustrated in the context of the Bluetooth short-range communication, wherein frequency hopping is used. The Base Station that is currently communicating with the handset, will give up a single hop. Any of the neighboring Base Stations that are not close to each other may use the same hop to transmit to the handset. The neighboring Base Stations that are close to each other will use different hops to call (communicate with) the handset. This is illustrated in FIGS. 14A, 14B, 14C and 14D.

FIG. 14A, which is similar to FIG. 1, illustrates a wireless communication system 1400 (e.g., WPBX) having a Base Station 391 that is currently communicating with a mobile unit 390 that is a wireless telephone handset, and a plurality (six shown) of neighboring Base Stations 392, 393, 394, 395, 396 and 397 that are waiting (available) for the handset 390 to enter their coverage areas. Each Base Station 391, 392, 393, 394, 395, 396 and 397 has an area of coverage 391a, 392a, 393a, 394a, 395a, 396a and 397a, respectively. The interconnections between the Base Stations, and between the Base Stations and a central Switch, such as shown in FIGS. 2 and 4, are omitted, for illustrative clarity.

FIG. 14B, which is similar to FIG. 10, illustrates that the Base Station 391 which is currently communicating with the handset 390, periodically (once in K hops) transmits with higher power $P_1$, in order to enable the neighboring Base Stations to synchronize their TOD. According to the handset detection technique being discussed, the Base Station 391 also periodically (once in M hops) skips a transmission on a single hop 702, 703 (shown as dashed lines) in order to allow the neighboring Base Stations 392, 393, 394, 395, 396 and 397 to transmit at these times. As shown in FIG. 14C, three of the neighboring Base Stations 393, 395, 397 transmit on even-numbered skipped hops 705. As shown in FIG. 14D, the other three of the neighboring Base Stations 392, 394, 396 transmit on odd-numbered skipped hops 707. At other times (other than the hops 705, 707), the neighboring Base Stations 392, 393, 394, 395, 396 and 397 may transmit normally to other handsets (not shown) to which they are connected.

As described hereinabove, the Base Station that is communicating with the handset sends the call parameters to neighboring Base Stations via the local area network (LAN 140) that connects all of the Base Stations. It will also send information regarding the timing of hops that they may use to call handsets that it is communicating with. As described hereinabove with respect to FIG. 11, the neighboring Base Stations can synchronize the TOD. According to the timing of the hops received with high energy ($P_1$), the Base Stations that wait for the call, can determine the times in which they are allowed to try to call the handset. In these times the Base Stations transmit to all handsets that are communicating with neighboring Base Stations.

Detecting Movement of a Handset

The two techniques for detecting a handset, described immediately hereinabove, are "passive" in the sense that they do not require any actions to be taken by the handset, other than the initial action of being engaged in a call (connected to a Base Station). The technique described immediately hereinbelow is "active" in the sense that it requires some further participation (albeit minimal) from the handset. However, such a mechanism is standard in most wireless communication protocols, even in those that were not originally meant to support mobility (handoff). In either case ("passive" or "active"), it is important to recognize that the present invention can work with standard handsets, without modification thereto.

Although the handsets do not need to have a mechanism for supporting (actively participating in) handoff, they preferably have a mechanism that allows checking whether their communication links are operating normally. For example, in the Bluetooth short-range communication link, a "PING" command that is sent on the asynchronous link is used to check whether the data communication link is operative. When the handset receives a "PING" command it will automatically respond with an "ECHO" message (response). Since the "PING" command is sent on an asynchronous link, and not the synchronous link that is used for voice communication, in does not disrupt the voice quality, but only slightly (and temporarily) reduces the available bandwidth for data transfer.

The "PING" command includes the following data fields:

Device address

Identifier

Length

Data (optional)

The "ECHO" response includes the:

Identifier

Length

Data (optional)

In the Identifier, an identification of the originating Base Station is sent. Hence, when the handset replies it is possible for any Base Station receiving the "ECHO" reply to know which Base Station originated the reply.

The "PING" command and "ECHO" response are used by a Base Station in order to determine whether a certain handset has entered its coverage area. Unlike the methods of passively detecting the handset presence, discussed hereinabove, this method allows detection of a Base Station that was not actively engaged in a call at the time of handoff. It is enough for the handset to have only created an initial communication with a Base Station.

FIGS. 15A and 15B, illustrate the use of "PING" command and the "ECHO" response by the Base Station that is waiting for the call.

As shown in FIG. 15A, the handset 121 is currently communicating with the Base Station #1 123 via communications link 122. During this time, the Base Station #2 124 that is waiting for the call will periodically send a "PING" command 145 to the handset 121. When the handset 121 enters the coverage area (is in range) of the waiting Base Station 124, and when it receives a "PING" command with its address, it will reply with an "ECHO" response 146. The "ECHO" response 146 is also received by the Base Station #1 123.

The waiting Base Station #2 124 transmits the "PING" command 145 during the hops that the Base Station #1 123 has dedicated (yielded) for this operation, as described hereinabove (see, e.g., FIG. 14B, 702, 703). The "ECHO" reply 146 will be received by both Base Stations 123 and 124, whereupon the Base Stations 123 and 124 can each measure the quality of the received signal ("ECHO") and report the measurements to the Switch (e.g., 129; FIG. 2). Based on this measurement of the quality of the received signal, the Switch 129 can compare signal quality and decide when is the right time to perform the handoff, and implement the handoff procedures described hereinabove.

FIG. 15B illustrates an alternative, "active" method for detecting the handset 121. In this example, The Base Station #1 123 that is currently connected to the handset 121 transmits a "PING" command 147, once in M hops. The handset 121 replies with an "ECHO" response 146' for each "PING" command 147 it receives. When the handset 121 enters the coverage area of neighboring Base Station #2 124, the neighboring Base Station #2 124 will receive the "ECHO" response 146' by monitoring each Mth hop, in order to receive the "ECHO" response of the handset 121 that is approaching it. When the neighboring Base Station #2 124 receives the "ECHO" response 146', it measures the quality of the received signal, and reports to the Switch 129. This method is different from the method previously described with respect to FIG. 15A in two aspects:

1) In the method of FIG. 15B, the Base Station 123 connected to the handset, does not skip each Mth hop, but rather transmits a "PING" to the handset
2) In the method of FIG. 15B, the neighboring Base Stations (e.g., 124) do not transmit "PING"s to the handset 121—rather, they only passively monitor each Mth hop The quality of each hop may be measured by many known methods, such as energy level measurement, signal-to-noise ratio (SNR) measurement, packet loss ratio and bit error rate measurement (BER) that can be performed on the header of each message.

Another Handset Detection Technique

Each Base Station maintains a "Neighbor Connections Table", which includes information about the connections between handsets and neighboring Base Stations. The "Neighbor Connections Table", includes the following information:

Connection number
Handset ID
Base Station ID
Handoff status: Idle/Started
Handset detection status
Number of successful "PING"
Time of last successful "PING"
Quality measurements in successful "PING"

FIG. 16A illustrates a technique (procedure) for detecting a handset that enters the coverage area of a Base Station when (as in the example of FIG. 15B) the Base Station that the handset is currently connected to generates the "PING" command that is sent to the handsets. All of the Base Stations (e.g., 391–397; FIG. 14A) preferably perform the same detection procedure, whether they the handset is connected with them or not.

When a hop is due (steps 400, 401), the even-numbered hops are used by the handset, and the Base Stations use the odd-numbered hops. In a step 402, a hop counter is incremented by one, and if (as determined in the step 403) it is the Kth hop, the Base Station will to try to send a "PING" to one of the handsets that are candidates for handoff. If it is not the Kth hop (step 403, "N"), the Base Station waits for the next hop (step 400).

As used herein, "NMAC" represents the address of the handset that will be called, and "NegTab" is an abbreviation of "Neighboring Connection Table".

If handoff has not started yet with any handset (step 404, "N"), all the handsets will be called in order. The pointer to the NegTab is incremented (step 405), and the address of the handset is retrieved from the NegTab (step 406). The Base Station then transmits a "PING" command with the address of the handset (step 407). When handoff has already started with one or more than one handsets, these handsets are "PING"ed more often than the others. The next item in the NegTab is checked (step 411) and, if handoff with it has already started, it will be "PINGED" (steps 412, 407). The handsets that have not started handoff, will be "PING"ed only once in K2 "PING"s (steps 410, 413, 414).

When an "ECHO" is received (step 420, "Y") and it is determined to be from a handset that communicates with a neighboring Base Station (step 419, "IN"), it will be compared to all the entries in the "Neighbor Connections Table" (NegTab) 421,422. If it is found in the NegTab (step 422, "Y"), the quality of the hop is measured (step 423) and a record of the average quality in the previous hops is maintained in the "Neighbor Connections Table" (step 424). The following measurement parameters are sent to the Switch (step 425):

Base Station communicating with handset
Base Station originating "PING"
Base Station receiving "PING"
Identification of handset
Quality of received signal FIG. 16B illustrates a procedure that a Base Station performs when it receives an "ECHO" response from one of the handsets that are connected to it (from FIG. 16A, step 419, "Y"). The "ECHO" response can be received either when the connected Base Station or one of its neighbors sends a "PING" message to the handset. (See, e.g., FIGS. 15A and 15B.)

First, the Base Station checks to see if the "ECHO" reply was caused by itself, or by one of the neighboring Base Stations (steps 430, 431). This information is contained in the Identifier of the "ECHO" reply, as described hereinabove.

If the "ECHO" was caused by a neighboring Base Station (step 431, "Y"), the quality of the received signal is measured and averaged (step 432), and the measurement parameters are sent the Switch (step 433) to be used by the Switch in determining when to perform handoff. If the Base Station itself caused the "ECHO" reply (step 431, "N"), the task simply exits ("B").

FIGS. 16A and 16B illustrated the procedure of transmitting the "PING" from the Base Station that the handset is connected too, and detecting the arrival of a handset from a neighboring Base Station.

FIG. 23 illustrates a procedure for performed by the Base Station when reception or transmission of a hop is required (steps 1200, 1201). Once in K hops (step 1202), if the next time slot is for transmission (step 1203), the Base Stations sends a "PING" to one of the handsets that are connected to it. Tcount is incremented (step 1204), and the next handset that appears in the list of handsets (Connection Table, or "ConTab") that are connected to the Base Station is chosen (step 1205).

The "PING" is sent with the address taken from the ConTab (step 1206). When it is time to receive a hop, the receiver looks for an "ECHO" response (step 1207). If an "ECHO" is received, and it originator was a neighboring Base Station (step 1208), the parameters are compared to the NegTab (step 1209), and if it is found in the table (step 1214), the quality of the signal is measured (step 1210) and averaged (step 1211). If the "ECHO" response was to a "PING" command that originated from the same Base Station, the quality is measured (step 1213). In both cases the connection parameters and the quality are sent to the Switch (step 1212).

When an "ECHO" response is received (FIG. 16A, step 425; or FIG. 16B, step 433; or FIG. 23, step 1212), the following data is sent to the Switch:

Received quality

If from handset from neighbor Base Station, the average quality of the received "PINGS"

If from handset connected to same Base Station, the received quality that is monitored continuously, and also the average quality of the received "PINGS"

Base Station originating "PING"

Base Station receiving "ECHO"

Base Station currently connected to handset

Measurement TOD

Performing Handoff

Two methods for detecting that a handset moves from one Base Station to another have been described hereinabove. The first handset detection method (FIGS. 13, 14A, 14B, 14C, 14D) is based on passive monitoring of the handset. In the second handset detection method (FIGS. 15A, 15B, 16A, 16B) the handsets are actively "PING"ed, and their "ECHO" responses are noted. Using either one of these two methods, a Base Station that is connected to a handset continuously sends received quality measurements to the Switch and, when a neighboring Base Station detects a handset, a quality measurement is also sent by the neighboring Base Station to the Switch. A Base Station receiving an "ECHO" from one of the handsets that are connected to it (e.g., FIG. 15B), also sends the quality measurement to the Switch. The decision as to when to perform handoff, between one Base Station and another, is made at the Switch, which uses these signal quality measurements from the Base Stations to determine the time for and destination of a handoff. FIG. 17A illustrates a method for making the handoff decision, when a passive detection method is used. FIG. 17B illustrates a method for making the handoff decision, when an active detection method is used.

FIG. 17A illustrates a procedure that is implemented at the Switch (129) in order to decide to which Base Station the handset should be handed. Energy measurements from two or more (three shown) Base Stations 801, 802 and 803 receiving a signal (i.e., the same signal) from a single handset (i.e., the same handset, not shown) are provided to the Switch, as described hereinabove (e.g., over the LAN 140). At the Switch, these measurements are "smoothed" by a plurality (three shown) of sliding window averaging filters 804, 805 and 806, respectively, and they are compared with one another by decision (handoff control) logic 807, which issues a signal ("Select Base Station") to effect handoff. The sliding widow average filters 804, 805 and 806 compute the average quality received from a given Base Station over the previous $T_r$ milliseconds, typically hundreds of milliseconds, (over a time interval encompassing at least two subsequent signals from the receiving Base Station), taking into account only the times in which the handset signal was received by more than one Base Station.

The following pseudo-code describes a preferred operation of the decision logic 807:

The inputs to the decision logic are marked by $X_1 \ldots X_k$.

The current base Station communicating with the handset is Base Station 'm'

---

The inputs to the decision logic are marked by $X_1...X_k$.
The current Base Station communicating with the handset is Base Station 'm'
(1) If maximum $(X_1,...,X_k) = X_j$
(2) If $X_j > X_m + D_1$
(3)     If time from previous handoff $> T_d$
(4)         Transfer call to Base Station j
(5) If $X_j > X_m + D_2$
(6)     Transfer call to Base Station j

---

If a Base Station receives the handset at a level which is stronger by at least $D_1$ decibels than the level which is currently received by the Base Station with which the handset currently communicates, and at least $T_d$ milliseconds have passed from the last handoff, a handoff is required. This is intended to address the situation of a moderate and slow movement of a handset from one Base Station to another.

If a Base Station receives the handset at a level, which is stronger by at least $D_2$ decibels than the level, which is currently received by the Base Station with which the handset currently communicates a handoff will be performed immediately. This is intended to address the situation of an abrupt move from one Base Station to another.

When the Base Stations use one of the active methods to detect handset presence, the decision algorithm is basically the same as has just been described. The main difference comes from the fact that in the active method the different Base Stations are able to determine the quality that they measured for a single hop, which all of them can identify. Therefore, the Switch is able to compute the quality difference per hop, and thus improve the timing accuracy of handoff.

FIG. 17B illustrates the handoff decision method when using an active detection method. According to the TOD indication that is received along with the quality measurements, the measurements of the same hops are aligned in time (808). They are then averaged over X hops (804, 805, 806), and the same decision logic (807) that was described above may be used to determine which is the most suitable Base Station to connect to the handset, and issue the "select Base Station" signal.

The methods described hereinabove relate to performing handoff between Base Stations when the handset is conducting a call. When a handset is not conducting a call it may move from one Base Station to the other. When it moves, one connection will be ended, and another will be created. The mechanism for ending a connection, and initiating a new one is part of the short-range wireless communication protocol. For example in the Bluetooth protocol, the handset searches for a Base Station, when it finds one, it stays connected to it. If it leaves the coverage area of the Base Station, the connection will end, and the handset will search again for a Base Station. This mechanism is sufficient for a handset that is not currently in a call, but it does not guarantee smooth handoff while in a call. Although this method may be suitable in some conditions, disconnecting from one Base Station and re-establishing connection with the other may take several seconds, and during this time it will not be possible to initiate a call. One of the advantages of the method of actively "PING"ing a handset is that its movement can be detected quickly, even when it is not engaged in a call, and this "waiting" period can be eliminated.

Operation Procedures

The following sections describe the operation procedures of the Base Stations and the Switch, that are used on the following events:

A new connection is created

A connection is closed

A handset presence is detected

Switch decides on handoff

Handoff performed by Base Stations

When receiving an update message from a Base Station

Base Station Procedures:
1) New connection created:

Create new low-level protocol instance.

Add connection to "Base Station Connections Table"

Set reserved hops for neighbors transmissions (if active detection method is used)

Send new connection information (handset ID, Base Station ID, handle to low-level protocol instance) to Switch Send new connection information to all neighboring Base Stations (handset, id, Base Station id, reserved hops, call's parameters: TOD, device address, encryption key, authentication key, links status, etc.)

2) Connection closed:

Close low-level protocol instance.

Remove connection from "Base Station Connections Table"

Send closed connection information to Switch (handset ID, Base Station ID, handle to low-level protocol instance)

Send closed connection information to neighboring Base Stations (handset ID, Base Station ID)

3) Receive new connection information from neighboring Base Station

Add connection information to "Neighboring Connections Table"

4) Receive closed connection information from neighboring Base Station

Remove connection from "Neighboring Connections Table"

5) Detect presence of handset in coverage area

Create low-level protocol instance.

Synchronize TOD

Measure received quality

Update Switch (handset ID, neighbor Base Station ID, and Base Station ID, TOD, handle of low-level protocol instance).

6) Receive message from high-level protocol

Check if corresponding low-level protocol is running on Base Station and, if it is:

Route message to the corresponding low-level protocol instance.

7) Receive handoff command with TOD of handoff

If the Base Station is the Base Station currently communicating with the handset:

Wait until handoff TOD

Stop transmissions to the handset

Move connection parameters from "Base Station connection table" to "Neighboring Connection Table"

If the Base Station was a neighbor of the Base Station communicating with the handset:

Wait until handoff TOD

Start transmitting to handset

Route call to destination Base Station or Switch

Send new connection information (handset id, Base Station ID, handle to low-level protocol instance) to Switch Send new connection information to all neighboring Base Stations (handset, ID, Base Station ID, reserved hops, call's parameters: TOD, device address, encryption key, authentication key, links status, etc.)

Switch procedures:
1) Receive new connection information

Create instance of high-level protocol

Update "Connections Table"

1) Receive close connection message

Close high-level protocol instance

Remove from "Connections Table"

1) Receive quality measurement from Base Station

If from Base Station connected to the handset,

Store measured quality and TOD of measurement

Check if a neighboring Base Stations should be removed from the handoff candidate list (according to last TOD in which they detected the handset), and remove if necessary If from a neighbor of the Base Station connected to the handset, Add neighbor as candidate for handoff to "Connection Table" with TOD of message.

Perform quality comparison and decision of handoff.
If a handoff is required:
Send handoff commands to the originating Base Station and the Base Station receiving the handset.
Update "Connections Table"
When there is more than one Switch in the system (see, e.g., FIG. 22) the Switch procedures will be slightly different, as follows:
1) Receive new connection information
   Create instance of high-level protocol
   Update "Connections Table"
   Send new connection information to all the Switches.
1) Receive close connection message
   Close high-level protocol instance
   Remove from "Connections Table"
   Send remove connection to all Switches
1) Receive quality measurement from Base Station
   If from Base Station connected to the handset
   Store measured quality and TOD of measurement
   Check if the neighboring Base Stations should be removed from handoff candidate list (according to last TOD in which they detected the handset), and remove if necessary
   If one of the neighboring Base Stations is connected to a different Switch, send updated information to the other Switch.
   If from a neighbor of the Base Station connected to the handset
   Add neighbor as candidate for handoff to "Connection Table" with TOD of message.
   Perform quality comparison and decision of handoff.
   If a handoff is required:
   Send handoff commands to the originating Base Station and the Base Station receiving the handset.
   Update "Connections Table"
   Update "Calls Table"
   Send information to all Switches
1) Receive update from another Switch
   If new connection: add item to "Connections Table"
   If closed connection: remove item from "Connections Table"
   If quality measurement: update "Connection Table"
   If handoff
   Update "Connections Table"
   Update "Calls Table"

The Switch also keeps a LOG file of the events in the system. The LOG file includes the quality measurements, call parameters (time, caller ID, called ID, reason for termination, etc.) and the handoff decisions. These may serve to analyze the Base Station's topology and allow for topology improvements and adjustments. For example the reason for a call termination may be correlated to low receive quality, which could imply that there is a "hole" in the coverage pattern.

Detection and Time Synchronization

FIG. 20 illustrates the implementation of detection and time synchronization method that is based on a correlator. As described hereinabove, the correlator/detector (308) was the basis for synchronization of TOD in FIG. 11, and for the detection of presence of a transmitter and synchronization in FIG. 13.

It is important for a neighboring Base Station to be able to detect and synchronize with a mobile unit prior to receiving a handoff. This process should be done as quickly as possible to ensure seamless handoff of a session. Generally, the process begins with a wide-range search for "target" signals having the correct timing for a mobile unit, based on the rough synchronization information provided by the Base Station which is connected with the mobile unit. These "target" signals are estimated, based on the rough synchronization data. When a match is found (an actual signal from mobile unit is acquired) the search range can be narrowed accordingly (and dramatically). Then, synchronization can proceed as described hereinabove.

The detector/correlator 2000 comprises a signal detector 1001 and a correlator 1002. The task of the detector/correlator 2000 is to provide information whether a target signal is currently received, and to estimate the parameters which serve the hand-off process. The signal detector 1001 and correlator 1002 receive the actual received signal 1008 and its corresponding time 1009 and frequency 1004, as illustrated, and correlates them to the emulated time and frequency instances 1006. The fine TOD, drift and quality of the target signal are estimated by the correlator 1002 which reports the estimated parameters 1007, along with a status which indicates whether the target signal has been acquired, or not. The task of the signal detector 1001 is to process the received signal 1008 and to estimate its time of arrival (TOA), i.e. the exact timing of a hop, and quality values 1003. This may be done by several techniques, which are well known from classical detection theory. As an example of such techniques, an energy detector and a matched filter can be used.

FIG. 21 shows an example of the implementation of the signal detector 1001 of FIG. 20. In FIG. 21, the received signal 1008, which is received from the RF receiver output, is fed to an energy detector 1011. The energy detector 1011 produces a signal 1014, which represents the temporal energy shape of the signal. The temporal energy shape 1014 is fed into a matched filter 1012. The matched filter 1012 has an impulse response, which matches the energy shape the target signal. As is known, per classical estimation and detection theory, the matched filter 1012 will produce maximum value at the time instance which represents an estimation of the time of arrival (TOA), i.e. exact timing of hops, of the target signal 1008. The maximum value of the filter output represents an estimation of the received signal quality. The time instance, which represents the estimation of the TOA, is represented in terms of the time clock 1009. The matched filter 1012 reports TOA and quality values of which the quality is above a threshold value $T_h$, and the maximum is a global maximum within a two-sided time window of $T_{s1}$ microseconds. Other implementations of the signal detector 1001 in FIG. 20 can be utilized. Such implementations can correlate the received signal 1008 with the known portions of the target signal temporal pattern instead of its energy temporal shape. Such implementations may achieve improved estimation performance.

The time-frequency correlator 1002 in FIG. 20 receives the TOA and quality values 1003 produced by the signal detector 1001 and corresponding frequency values 1004, which are the actual tuning frequency of the RF receiver. These inputs are referred to herein as the 'actual' TOA-frequency-quality instances. These include the estimated information of the signals, which are received from the various sources. On the other inputs, the time/frequency correlator 1002 receives emulated values of TOA and frequency 1006 instances for a specific target source (i.e. a specific handset). We will refer to these values hereafter as 'target' TOA-frequency instances. The time-frequency correlator seeks matches in the instances from both sources—the 'actual' and the 'target' and detects TOA-frequency patterns at the 'actual' instances which are 'similar' to the 'target' pattern. This process is performed in two possible modes:
1. 'Acquisition' mode in which a match of the 'target' to 'actual' patterns is searched over longer time shifts periods, which cover the uncertainty of the possible fine TOD.
2. 'Tracking' mode in which the fine TOD and drift have been already estimated, and the match between of the 'target' to 'actual' is searched and verified on new TOA-frequency instances over a shorter uncertainty period.

The 'actual' data 1003 and 1004 is written into 'actual' instances history buffer (e.g., FIFO) and constitutes a list of which records consists of 'actual_TOA', 'actual_frequency' and 'actual_quality'. The 'target' data 1006 is written into 'target' instances histories buffer (e.g., FIFO) and constitutes a list of which records consist of 'target_TOA' and 'target_frequency'.

In the 'acquisition' mode, at any given time, records from both lists of which TOA values are 'younger' than $T_{y1}$ milliseconds (where $T_{y1}$ is typically 10,000) in relation to current time clock (to be referred hereafter as 'young' records) are processed as follows:

For each 'target' record, look for 'actual' records, which satisfy:
  Matching frequency value (i.e. 'actual_frequency'='target_frequency').
  Absolute value of 'TOA_diff' ('TOA_diff'='known_diff' ('actual_TOA'-'target_TOA')) is smaller than $T_{y2}$ milliseconds (where $T_{y2}$ is typically 500). Note: 'known_diff' is 0 in the acquisition mode. The 'target' and 'actual' records, which satisfy the conditions, are referred hereafter as 'candidate records'.

For each of the 'candidate_records' write the corresponding 'TOA_diff', 'actual_quality' value and 'actual_TOA' value into a 'candidates_list'.

When all the 'young_target' records are processed against all 'young_actual' records, sort the 'candidate_list' by the 'TOA_diff' values and produce a 'diff_histogram' with resolution of $T_{y3}$ microseconds (where $T_{y3}$ is typically 1000) as follows:

Scan the sorted 'candidate_list' records, identify the 'TOA_diff' values which are within the TOA diff range of each bin, and accumulate the corresponding 'quality_values' producing 'diff_quality_histogram' values per each bin.

Search the 'diff_quality_histogram' for values, which are bigger than Ky (where Ky is typically 50). If found, set the status output 1007 value to 'detected', and identify the corresponding 'actual_TOA' and 'TOA_diff' values. The corresponding 'actual_TOA' and 'actual_diff' values are referred to hereinafter as a 'diff_cluster' of records. If no 'diff_quality_histogram' values exceed Ky, set the status output 1007 to 'not_detected'.

If status has been set to 'detected' perform a 'least mean square error' (LMSE) estimation of a linear line which mostly fits the two-dimensional 'diff cluster' instances ('actual_TOA' by 'actual_diff'). LMSE estimation is a well-known estimation technique and is described in the classical literature.

The estimated linear line can be represented as:
diff='est diff0'+'est drift'*(TOA-TOA0) where TOA0 is the smallest 'actual TOA' value out of the 'diff cluster' records, 'est diff0' is the estimated output parameter of 'fine TOD' 1007 and 'est' drift is the estimation the output parameter 'drift' 1007. The 'diff quality histogram' value normalized by the corresponding 'bin population' is the 'quality' output 1007 value.

In the 'tracking' mode, at any given time, process the data in a similar way as in the 'acquisition mode but with the following differences:
  The value of 'known diff' is set to 'prev_est_diff0'+'prev_est_drift'*('current_TOA0'-'prev_TOA0'). The terms 'prev_est_diff0' and 'prev_TOA0' represented the 'est_diff0' and 'TOA0' which has been evaluated in the previous calculation (either in 'acquisition' mode or in 'tracking' mode). The term 'current_TOA0' is the 'TOA0' of current calculation.
  A smaller value of $T_{y4}$ microseconds (when Ty4 is typically 2000) for the 'tracking' mode replaces $T_{y2}$ of the 'acquisition' mode.

Base Station

FIG. 18 illustrates, in block diagram form, major components of a Base Station 1800. A plurality (three shown) of front-end processors 604, 605 and 606 are connected to a plurality (three shown) of antennas 601, 602 and 603, respectively. The front-end processors 604, 605 and 606 perform the low-level protocols of the short-range communication protocol, described hereinabove.

When idle, a front-end processor 604, 605 and 606 waits for a handset to establish a new connection. When a connection is created it reports the call parameters (e.g., Bluetooth device address, TOD, Encryption key, authentication key, etc.) and transfers the call stream to the central processing unit 607. When a front-end processor is idle, it can also be used to receive (detect, monitor) a handset that is leaving a neighboring Base Station. The central processing unit 607 then sends the front-end processor, the call parameters, and the exact time of handoff. The front-end processor, would at that time, continue the communicating with the handset, as if it was still in the neighboring Base Station.

A separate circuit module 612 (TOD Synchronization & Handset Detection) is used to detect arrival of new handset, and also to synchronize the TOD of all the calls, according to the techniques described hereinabove. This unit 612 is shown having its own antenna 611.

The central processing unit 607 controls the operation of the front-end processors 604, 605 and 606, receives data about new handoff and fine TOD estimation, receives data from neighboring Base Station, maintains the "Neighbor Connection Table", communicates with the Switch and the other Base Stations. The local area network interface 609 is suitably a standard interface, for example a connection to a 10Base-T or 100-Base-T Ethernet, for connecting to the Local Area Network (LAN) 140. Memory 608 and Non-Volatile Memory (NVM) 610 is shown connected to the central processing unit (CPU) 607.

FIG. 19 illustrates, in greater detail, an implementation of a representative one 604 of the front-end processors 604, 605 and 606 described hereinabove with respect to FIG. 18. A base-band processor 631 determines the transmission and reception channels, encodes and decodes speech, deals with error correction, authentication and encryption. The radio frequency front end 630 modulates and demodulates the data, and connects to the antenna 601. The base-band processor 631 controls the frequency ("frequency control" 633) of each hop, sends and receives data ("energy, time of detection" 634) from the RF front end, and receives indication of signal strength ("base band parameters" 635).

Applications for the WPBX

Most of the preceding sections discussed the use of the methods disclosed in the current invention for a WPBX supporting telephony applications. Except for the methods shown in FIGS. 5, 6 and 7, most of the methods disclosed hereinabove are application independent, as follows:

The method for dividing the short-range communication protocol in order to support mobility of devices. The high-level protocols, including telephony-related protocols, and also protocols for data transfer, such as PPP over the short-range communication link.

The methods for synchronizing the Base Station.

The methods for detecting movement of transmitter from one Base Station to another The methods for decide when to perform handoff and to what Base Station to hand the call.

These methods can be implemented in order to connect mobile devices that are equipped with a short-range communication transmitter/receiver such as a Bluetooth chipset. Such devices may move from the coverage area of one Base Station to the coverage area of another, when the Switch and Base Stations handle the handoff of the connection from one Base Station to another. Typical application may be the connection of laptop computers equipped with a Bluetooth short-range communication link to the organization's e-mail server. Another possible application is connecting such mobile devices that for example utilize the PPP (point-to-point protocol) over Bluetooth wireless link, to the Internet, via a central remote access server. A system may also support several such applications.

For example in FIG. 24, a personal data (or digital) assistant (PDA) 1301, a laptop computer 1302 and a cellular handset 1303, connect to the systems Base Stations 1304 and 1305, as illustrated. The PDA 1301 and the laptop 1302 may connect, via the local area network (LAN) 1306 to an e-mail server 1308 in order to send or receive messages, and may also connect to a remote access server (RAS) 1309 for Internet connection. The cellular handset 1303 may connect to another handset (not shown) or, via a Telephony Gateway 1306 to the PSTN. The Base Stations 1304 and 1305 and the Switch 1307 handle the various levels of the communication protocol, utilizing the methods described hereinabove.

It is within the scope of the invention that the mobile unit is a device which is any of the following devices: telephone handset, standard cordless telephone handset, cellular telephone handset, personal data device, personal digital assistant (PDA), computer, laptop computer, e-mail server, and a device utilizing point-to-point protocol (PPP) to the Internet via a central remote access server, a headset (including a cordless headset), a personal server, a wearable computer (or computing device), a wireless (video or still) camera, or a mobile music players (i.e., MP-3 devices etc).

Although the invention has been described with respect to a limited number of embodiments, it will be appreciated that many variations, modifications and other applications of the invention may be made, and are intended to be within the scope of the invention, as disclosed herein.

What is claimed is:

1. In a wireless communication system comprising a Base Station connected with at least one mobile unit, a method of detecting the presence of a specific mobile unit in a coverage area of at least one neighboring Base Station, comprising:

the Base Station connected with the specific mobile unit provides, independently of the specific mobile unit, and independently of a strength of a signal received from the specific mobile unit by the Base Station connected with the specific mobile unit, to the at least one neighboring Base Station, information about the connection with the specific mobile unit, including rough TOD and a device address for the specific mobile unit;

at the at least one neighboring Base Station, receiving information and generating a list of frequencies in which the specific mobile unit is likely to transmit;

and at the at least one neighboring Base Station, checking for a signal transmitted by the specific mobile unit.

2. Method, according to claim 1, further comprising:

at the neighboring Base Station, monitoring frequencies that are not blocked by interferences.

3. Method, according to claim 2, further comprising:

for each frequency that is monitored, maintaining a histogram of a number of hops that have been detected in a certain duration of time, and their average signal-to-noise ratios.

4. Method, according to claim 3, further comprising:

determining a measure of spectral cleanness of a frequency being monitored as a function of signal-to-noise ratios (SNRs) of the hops.

5. Method, according to claim 4, further comprising: monitoring a group (M) of frequencies that have a best cleanness measure most of the time.

6. Method, according to claim 5, further comprising:

periodically monitoring a frequency which is not in the group of frequencies having the best cleanness measure.

7. Method, according to claim 1, wherein the specific mobile unit is a device selected from the group consisting of:

telephone handset, standard cordless telephone handset, cellular telephone handset, personal data device, personal digital assistant (PDA), computer, laptop computer, e-mail server, a device utilizing point-to-point protocol (PPP) to the Internet via a central remote access server, a headset, a personal server, a wearable computer, a wireless camera, and a mobile music player.

8. Method, according to claim 1, further comprising:

providing communication links between the Base Stations, wherein the communication links between the Base Stations are selected from the group consisting of RF links and land lines; and transferring connection status information and rough synchronization information between the Base Stations over the communications links.

9. Method, according to claim 1, wherein:

the Base Stations are connected via a wired or wireless local area network (LAN).

10. Method, according to claim 1, wherein:

the wireless communication system comprises a wireless private branch exchange (WPBX) handling calls from mobile units comprising handsets.

11. In a wireless communication system comprising a Base Station connected with at least one mobile unit, a method of detecting the presence of a specific mobile unit in a coverage area of at least one neighboring Base Station, comprising:

the Base Station connected with the specific mobile unit provides, independently of the specific mobile unit, directly to the at least one neighboring Base Station, information about the connection with the specific mobile unit, including rough TOD and a device address for the specific mobile unit;

at the at least one neighboring Base Station, receiving information and generating a list of frequencies in which the specific mobile unit is likely to transmit;

and at the at least one neighboring Base Station, checking for a signal transmitted by the specific mobile unit.

* * * * *